(12) United States Patent
Svensson et al.

(10) Patent No.: US 10,794,334 B2
(45) Date of Patent: Oct. 6, 2020

(54) VALVE ARRANGEMENT

(71) Applicant: VOLVO TRUCK CORPORATION, Gothenburg (SE)

(72) Inventors: Stig Arne Svensson, Torslanda (SE); Lennart Langervik, Onsala (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 16/099,456

(22) PCT Filed: Jun. 2, 2016

(86) PCT No.: PCT/EP2016/062558
§ 371 (c)(1),
(2) Date: Nov. 7, 2018

(87) PCT Pub. No.: WO2017/207056
PCT Pub. Date: Dec. 7, 2017

(65) Prior Publication Data
US 2019/0085792 A1 Mar. 21, 2019

(51) Int. Cl.
*F02M 23/00* (2006.01)
*F01L 1/28* (2006.01)
(Continued)

(52) U.S. Cl.
CPC ............. *F02M 23/006* (2013.01); *F01L 1/28* (2013.01); *F01L 3/08* (2013.01); *F02B 21/00* (2013.01);
(Continued)

(58) Field of Classification Search
CPC ....... F02M 23/006; F02B 29/06; F02B 21/00; F02B 29/00; F01L 1/28; F01L 3/08; Y02T 10/146
See application file for complete search history.

(56) References Cited

U.S. PATENT DOCUMENTS 3,881,459 A * 5/1975 Gaetcke .................... F01L 1/28
123/188.1
3,987,769 A 10/1976 Yew
(Continued)

FOREIGN PATENT DOCUMENTS

CN 1285461 A 2/2001
DE 69110895 D1 8/1995
(Continued)

OTHER PUBLICATIONS

International Search Report (dated Sep. 12, 2016) for corresponding International App. PCT/EP2016/062558.
(Continued)

*Primary Examiner* — Jacob M Amick
*Assistant Examiner* — Charles Brauch
(74) *Attorney, Agent, or Firm* — Venable LLP; Jeffri A. Kaminski

(57) ABSTRACT

A valve arrangement for supplying air to a combustion chamber of an internal combustion engine includes a first valve, the first valve including a first valve head, a first valve stem assembly and an internal cavity, which is at least partly located in the first valve stem assembly, and a second valve partly arranged within the internal cavity of the first valve, the second valve including a second valve head and a second valve stem assembly, and being movable within the internal cavity between an upper, closed position and a lower, open position, wherein a junction seal extends over a junction between the first valve stem assembly and the second valve stem assembly when the second valve is in the closed position. A leakage preventing arrangement is arranged to hinder leakage of liquid from the outside of the junction seal from reaching in between the first valve stem assembly and the second salve stem assembly.

22 Claims, 14 Drawing Sheets

(51) Int. Cl.
  *F01L 3/08*    (2006.01)
  *F02B 21/00*   (2006.01)
  *F02B 29/00*   (2006.01)
  *F02B 29/06*   (2006.01)

(52) U.S. Cl.
  CPC ............. *F02B 29/00* (2013.01); *F02B 29/06* (2013.01); *Y02T 10/146* (2013.01)

(56) References Cited

U.S. PATENT DOCUMENTS

| | | |
|---|---|---|
| 5,357,914 A | 10/1994 | Huff |
| 5,465,691 A | 11/1995 | Capaldo |
| 6,138,616 A | 10/2000 | Svensson |
| 2007/0039584 A1 | 2/2007 | Ellingsen |

FOREIGN PATENT DOCUMENTS

| | | |
|---|---|---|
| DE | 19958635 A1 | 6/2001 |
| DE | 102013218777 A1 | 3/2015 |
| EP | 0802307 A1 | 10/1997 |
| FR | 2979378 A1 | 3/2013 |
| GB | 239067 A | 9/1925 |
| WO | 9803776 A1 | 1/1998 |
| WO | 2010104985 A2 | 9/2010 |

OTHER PUBLICATIONS

China Office Action dated Jul. 29, 2020, in corresponding China Application No. 201680086310.7, 6 pages.

\* cited by examiner

VALVE ARRANGEMENT

BACKGROUND AND SUMMARY

The invention relates to a valve arrangement for supplying air to an internal combustion engine.

The invention may be applied in any internal combustion engine, and in particular in internal combustion engines intended for heavy-duty vehicles, such as trucks, buses and construction equipment.

In connection with combustion engines, turbo chargers are often utilised which comprise a turbine which is driven by the flow of exhaust gases. The energy which is thus absorbed by the turbine is then transferred to a compressor which is arranged to compress the air on the intake side of the combustion engine and thus increase the amount of air in the combustion chamber. This means that a larger amount of fuel can be fed to a combustion chamber in an engine, thus increasing the torque and the power of the engine.

In turbocharged diesel engines intended for, for example, commercial vehicles, the available torque from the engine during take-off is often somewhat inadequate. The reason for this is that an engine equipped with a turbocharger performs worse than a normally aspirated engine at low rpm's due to that the turbocharger is a hindrance of the aspiration. The fact that the engine has a take-off performance which is worse than a normally aspirated engine means that the amount of air which is typical for a turbocharged diesel engine is not supplied. This in turn means that the amount of fuel which is injected in the engine must be limited at low rpm's in order to minimize the amount of smoke produced due to incomplete combustion due to lack of air. The turbo charger will with increased exhaust energy supply an additional amount of air which will permit an increased amount of fuel and by that increased engine torque and engine power.

The above-mentioned sequence of events is furthermore unfavourable since it contributes to reduced performance during the take-off phase of the engine. The engine may be perceived by users as "insufficient" during the take-off phase, since it has been necessary to limit the amount of fuel supplied during the initial "aspirating engine" phase, also known as turbo-lag.

One way of eliminating the above-mentioned turbo lag, is to feed extra additional air and by that additional fuel, to the engine during this take-off, or during other load cases where engine response is required, in order to thus simulate the turbo function and create the possibility of feeding extra fuel to the engine.

For example, U.S. Pat. No. 6,138,616 discloses a valve arrangement in a combustion engine which is preferably equipped with a turbo unit, where the turbo function can be initiated earlier than in previously known devices and which adds to the starting torque of the engine. In particular, the valve arrangement comprises, in addition to a first valve to supply air to the combustion chamber when in an open position, a second valve allowing supply of additional air to said combustion chamber.

The valve arrangement of U.S. Pat. No. 6,138,616 is a valve-in-valve arrangement, i.e. the second valve is arranged coaxially with the first valve so as to be movable within a cavity of the first valve.

Valve-in-valve arrangements for supplying additional air to an internal combustion engine, such as exemplified by U.S. Pat. No. 6,138,616 are subject to environmental conditions in the engine which may put a strain on the valve arrangements, leading to reduced performance and/or increased wear.

It is desirable to provide a valve arrangement which has an improved resistance against problems associated with the environment in the engine during use of the valve arrangement.

Accordingly, according to an aspect of the invention, there is provided a valve arrangement for supplying air to a combustion chamber of an internal combustion engine, the valve arrangement comprising a first valve, the first valve comprising a first valve head, a first valve stem assembly and an internal cavity, which is at least partly located in the first valve stem assembly, the first valve being movable between an upper, closed position of the valve, and a lower, open position, in which open position air may be supplied to the combustion chamber past the first valve head, and a second valve partly arranged within the internal cavity of the first valve, the second valve comprising a second valve head and a second valve stem assembly, and being movable within the internal cavity between an upper, closed position, in which closed position the second valve head is in contact with an inner surface of the first valve head, and a lower, open position in which open position additional air may be supplied to the combustion chamber via the internal cavity past the second valve head. A junction leakage preventing means is arranged to hinder leakage from reaching in between the first valve stem assembly and the second valve stem assembly.

It has been realised that liquid leakage, notably oil leakage, into the valve arrangement may lead to coking and hence to reduced performance of the valve arrangement. In this context, it has also been identified that the junction between the first valve stem assembly and the second valve stem assembly may be particularly prone to such leakage. Accordingly, by providing a junction leakage preventing means in order to hinder leakage from reaching in between the first valve stem assembly and the second valve stem assembly, problems, e.g., with coking, may be reduced.

Optionally, the valve stem assembly comprises a junction seal extending over a junction between the first valve stem assembly and the second valve stem assembly, when the second valve is in the closed position. The junction leakage preventing means is advantageously arranged to hinder leakage of liquid from the outside of the junction seal from reaching in between the first valve stem assembly and the second valve stem assembly.

Optionally, the valve arrangement comprises a stem joining device extending between the first valve stem assembly and the second valve stem assembly and allowing relative movement between the first valve stem assembly and the second valve stem assembly between the closed position and the open position of the second valve.

Optionally, the stem joining arrangement may form the junction seal.

Optionally, the stem joining arrangement may comprise separate parts, wherein one out of the separate pans forms the junction seal. Alternatively, the stem joining arrangement may comprise joined parts, wherein one or more of the parts form the junction seal.

Optionally, the stem joining device comprises an upper washer and a lower washer.

Optionally, the upper washer or the lower washer forms the junction seal, preferably the upper washer forms the junction seal.

Optionally, the upper washer is arranged in connection to the second valve stem assembly, and/or the lower washer is arranged in connection to the first valve stem assembly.

The upper and/or lower washer may be arranged to the respective valve stem assembly via inner portions of the upper and/or lower washer, respectively.

The upper and/or lower washer may be directly connected to the respective valve stem assembly, or optionally, the upper and/or lower washer may be indirectly connected to the respective valve stem assembly via one or more additional connector parts.

Optionally, a first spring member is arranged to bias the first valve stem assembly towards the closed position of the first valve. To this end, the first spring member may be arranged so as to act on the lower washer.

Optionally, a second spring member is arranged to bias the second valve stem assembly towards the closed position of the second valve. To this end, the second spring member array be arranged so as to act on the upper washer Optionally, the first and second spring members may be coaxially arranged. For example, the first spring member may be arranged radially inside the second spring member.

Optionally, the junction leakage preventing means comprises at least one member arranged on the outside of the junction seal.

For example, the junction leakage preventing means may be arranged on the outside of said junction seal and outside the stem joining arrangement. In another example, the junction leakage preventing means may be arranged on the outside of the junction seal, but on the inside of the stem joining arrangement.

Optionally, the junction leakage preventing means comprises a member being arranged upwards of the junction seal.

Optionally, the junction leakage preventing means comprises a member being arranged to seal between the stem joining arrangement and the second valve stem assembly, for example between the upper washer of a stem joining arrangement and the second valve stem assembly.

Optionally, the junction leakage preventing means comprises a member being arranged inside the stem joining device, for example between the upper washer and the lower washer of a stem joining device.

Optionally, the member forms a sealing member, preferably the sealing member forms a circumferential lip.

Optionally, the member is compressible for allowing movement between the open and closed positions of the second valve. For example, the member may be elastic.

Optionally, the junction leakage preventing means comprises at least one member being arranged on the inside of the junction seal.

Optionally, the junction leakage preventing means comprises a member being arranged between said first valve stem assembly and said second valve stem assembly. Said sealing member may be arranged so as to form a protruding portion from said first valve stem assembly and said second valve stem assembly may comprise a recess adapted to at least partially receive said protruding portion, when said second valve is in a fully open position.

Optionally, the leakage preventing means comprises a member being a sealing member arranged between the first valve stem assembly and the second valve stem assembly, the sealing member bridging between the first valve stem assembly and the second valve stem assembly when the second valve is in a fully closed position.

Optionally the junction leakage preventing means comprises a member in the form of a circumferential cavity in the junction seal, the circumferential cavity opening towards the junction between the first and second valve stem assemblies.

The circumferential cavity may be in the form of a circumferential ridge, extending continuously about the junction. Alternatively, the circumferentially cavity may be discontinuous, e.g. in the form of a plurality of indentations arranged about the junction.

Optionally, the junction forms a gap having a varying longitudinal extension between the closed and the open position of the second valve.

Optionally, the second valve stem assembly comprises a valve tip, the valve tip comprising a downward abutment surface, and the first valve stem assembly comprising an upward abutment surface, facing the downward abutment surface, wherein the gap is formed between the downward and upward abutment surfaces.

Optionally, a valve guide is arranged to surround a portion of the first valve stem assembly.

Optionally, the valve guide comprises an air passage allowing supply of additional air to the combustion chamber via the internal cavity in the first valve, when the first valve is in its closed position.

Optionally, the valve arrangement may comprise a second leakage preventing means (i.e. a guide leakage preventing means), for preventing liquid from leaking from a region externally of the rust valve stem assembly to the valve guide air passage.

Moreover, the present disclosure relates to a valve arrangement for supplying air to a combustion chamber of an internal combustion engine, the valve arrangement comprising a first valve, the first valve comprising a first valve head, a first valve stem assembly and an internal cavity, which is at least partly located in the first valve stem assembly, the first valve being movable between an upper, closed position of the valve, and a lower, open position, in which open position air may be supplied to the combustion chamber past the first valve head, and a second valve partly arranged within the internal cavity of the first valve, the second valve comprising a second valve head and a second valve stem assembly, and being movable within the internal cavity between an upper, closed position, in which closed position the second valve head is in contact with an inner surface of the first valve head, and a lower, open position in which open position additional air may be supplied to the combustion chamber via the internal cavity past the second valve head, comprising a stem joining device extending between the first valve stem assembly and the second valve stem assembly and allowing relative movement between the first valve stem assembly and the second valve stem assembly, wherein at least one member is arranged to seal between the stem joining device and the first valve stem assembly or the second valve stem assembly, for hindering leakage of liquid from reaching in between the first valve stem and the second valve stem.

Optionally, the at least one member may be arranged on the outside of the stem joining device. For example, the at least one member may be arranged to seal between an outside of the stem joining device and the second valve stem assembly.

Optionally, the at least one member may be arranged inside the stem joining device. For example, the at least one member may be arranged to seal between an inside of the stem joining device and the first valve stem assembly.

Moreover, the present disclosure relates to a valve arrangement for supplying air to a combustion chamber of an internal combustion engine, the valve arrangement comprising a first valve, the first valve comprising a first valve head, a first valve stem assembly and an internal cavity, which is at least partly located in the first valve stem assembly, the first valve being movable between an upper, closed position of the valve, and a lower, open position, in which open position air may be supplied to the combustion chamber past the first valve head, and a second valve partly arranged within the internal cavity of the first valve, the second valve comprising a second valve head and a second valve stem assembly, and being movable within the internal cavity between an upper, closed position, in which closed position the second valve head is in contact with an inner surface of the first valve head, and a lower, open position in which open position additional air may be supplied to the combustion chamber via the internal cavity past the second valve head, comprising a sealing member arranged between said first valve stem assembly and said second valve stem assembly said sealing member being arranged so as to form a protruding portion from said first valve stem assembly, and said second valve stem assembly comprising a recess adapted to at least partially receive said protruding portion, when said second valve is in a fully open position.

Moreover, the present disclosure relates to a valve arrangement for supplying air to a combustion chamber of an internal combustion engine, the valve arrangement comprising a first valve, the first valve comprising a first valve head, a first valve stem assembly and an internal cavity, which is at least partly located in the first valve stem assembly, the first valve being movable between an upper, closed position of the valve, and a lower, open position, in which open position air may be supplied to the combustion chamber past the first valve head, and a second valve partly arranged within the internal cavity, of the first valve, the second valve comprising a second valve head and a second valve stem assembly, and being movable within the internal cavity between an upper, closed position, in which closed position the second valve head is in contact with an inner surface of the first valve head, and a lower, open position in which open position additional air may be supplied to the combustion chamber via the internal cavity past the second valve head, comprising a junction seal formed over a junction between the first valve stem assembly and a second valve stem assembly, said junction seal comprising a circumferential cavity opening towards said junction.

It will be understood that features described in relation to one of the variants of valve arrangements described in the above may, where suitable, be applied also to the other variants of the valve arrangements.

Moreover, there is provided an internal combustion engine comprising any of the valve arrangements described in the above.

Further, there is provided a vehicle comprising an of the internal combustion engine comprising any of the valve arrangements described in the above.

The various examples of junction leakage preventing means described in the above may be provided alone or in different combinations.

Further, there may be provided a valve arrangement for supplying air to a combustion chamber of an internal combustion engine, the valve arrangement comprising a first valve, the first valve comprising a first valve head, a first valve stem assembly, and an internal cavity which is partly located in the first valve stem assembly and open towards a lower surface of the first valve head. A valve guide is arranged to surround a portion of the first valve stem assembly, such that the first valve stem assembly is movable in the valve guide along a longitudinal direction between an upper, closed position and a lower, open position. In the open position, air may be supplied to the combustion chamber past the first valve head. The valve guide comprises a valve guide air passage allowing supply of additional air to the combustion chamber via the internal cavity in the first valve. Further, the valve arrangement comprises a guide leakage preventing means for preventing liquid from leaking from a region externally of the first valve stem assembly to the valve guide air passage.

By the provision of a valve arrangement which comprises guide leakage preventing means for preventing liquid from leaking from a region externally of the first valve stem assembly to the valve guide air passage, the risk of clogging or coking at the valve guide air passage may be reduced. Further, liquid being introduced to the valve guide air passage risks reaching into the internal cavity of the first valve stem assembly and/or into passages connecting the valve guide air passage with the internal cavity. Hence, inconveniences resulting from liquid leaking via the valve guide air passage e.g. to the internal cavity may also be reduced.

Optionally, the guide leakage preventing means may be adapted for preventing liquid from leaking from a region located between the first valve stem assembly and the valve guide, to the valve guide air passage.

Optionally, the guide leakage preventing means may comprise a liquid drainage means for draining liquid from the region.

Optionally, the region is located longitudinally above the valve guide air passage.

Optionally, the liquid drainage means is arranged to drain liquid from the region to another region formed between the first valve steer assembly and the valve guide, the other region being located longitudinally below the valve guide air passage.

Optionally, liquid drainage means comprises a bypass channel for draining liquid past the valve guide air passage in the longitudinal direction.

Optionally, the bypass channel is at least partly formed in the valve guide, preferably by a longitudinally extending outer groove in an outer surface of the valve guide.

Optionally, the liquid drainage means comprises a fluid drainage volume arranged in liquid connection with the region upwards of the valve guide air passage.

Optionally, the liquid drainage means comprises a liquid collection volume arranged in liquid connection with the region downwards of the valve guide air passage.

Optionally, the bypass channel fluidly connects the liquid drainage volume and the liquid collection volume.

Optionally, the liquid collection volume and/or liquid drainage volume is/are formed by an internal groove(s) in the valve guide.

Optionally, the first valve stem assembly comprises a stem air passage, wherein the stem air passage is configured to convey additional air from the valve guide air passage to the internal cavity of the first valve, when the first valve is in a closed position.

Optionally, the fluid collection volume is arranged to be spaced from the stem air passage during movement of the first valve stem assembly between the upper, closed position and the lower, open position.

Optionally, the valve arrangement may comprise a second valve at least partly arranged within the cavity of the first valve, the second valve comprising a second valve head and a second valve stem assembly arranged at least partly within the first valve stem assembly, wherein the second valve head is arranged for interaction with a valve seat in the first valve head for controlling supply of additional air to the combustion chamber via the internal cavity in the first valve.

Optionally, the guide leakage preventing means comprises a fluid entry preventing means for preventing fluid from entering a region between the first valve stem assembly and the valve guide.

Optionally, the first valve stem assembly is arranged to extend upwardly from the valve guide at least to a first spring washer, the first spring washer being adapted to abut a first spring biasing the first valve stem assembly towards a closed position of the first valve.

Optionally, the fluid entry preventing means comprises a skirt extending circumferentially about the first valve stem assembly and longitudinally downwards from the first spring washer at least to the valve guide, preferably over at least a portion of the valve guide, and arranged to prevent liquid from entering between the valve stem assembly and the valve guide.

Optionally, the fluid entry preventing means further comprises a guide sealing arranged to seal between the valve guide and the first valve stem assembly.

Optionally, the skirt extends longitudinally downwards from the lower spring washer past the guide sealing.

Optionally, the skirt extends between a stem joining device and the valve guide.

Optionally, the lower spring washer comprises longitudinally extending liquid drainage apertures, preferably at least 2, more preferred at least 4, most preferred at, least 8 liquid drainage apertures.

Optionally, the skirt is arranged circumferentially inwards of the first spring.

Moreover, there is provided an internal combustion engine comprising a valve arrangement as described in the above.

Further, there is provided a vehicle comprising an internal combustion engine comprising a valve arrangement as described in the above.

In a second aspect, there is provided a valve guide for a valve arrangement in an internal combustion engine, the valve guide being configured to surround a portion of a first valve stem assembly such that the first valve stem assembly is movable in the valve guide, the valve guide comprising a side wall forming a generally cylindrical inner surface and a generally cylindrical outer surface about a longitudinal central axis characterized in that the inner surface comprises a first inner recess, for forming a liquid drainage volume when the valve guide is in the valve arrangement, and a second inner recess, being longitudinally spaced from the first recess, for forming a liquid collecting volume when the valve guide is in the valve arrangement.

Such a valve guide will be suitable for use in a valve arrangement as described previously.

Optionally, the valve guide comprises an air passage extending radially through the side wall of the valve guide.

Optionally, the air passage is located longitudinally between the first recess and the second recess.

Optionally, the valve guide comprises bypass means for forming at least part of a bypass connection for fluidly connecting the first inner recess and the second inner recess.

Optionally, the bypass means comprises a groove in the outer surface.

Optionally, the valve guide may be comprising a first liquid connection through the side wall, the first connection connecting the first inner recess to the outer groove, and a second liquid connection through the side wall, the second liquid connection connecting the second inner recess to the outer groove.

Optionally, the first and/or second recess forms a continuous annular inner recess.

The various examples of guide leakage preventing means described in the above may be provided alone or in combination.

Also, junction leakage preventing means as described herein and guide leakage preventing means may advantageously be provided in any combination.

In particular there is provided a valve arrangement as described in the above comprising a valve guide as described in the above.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
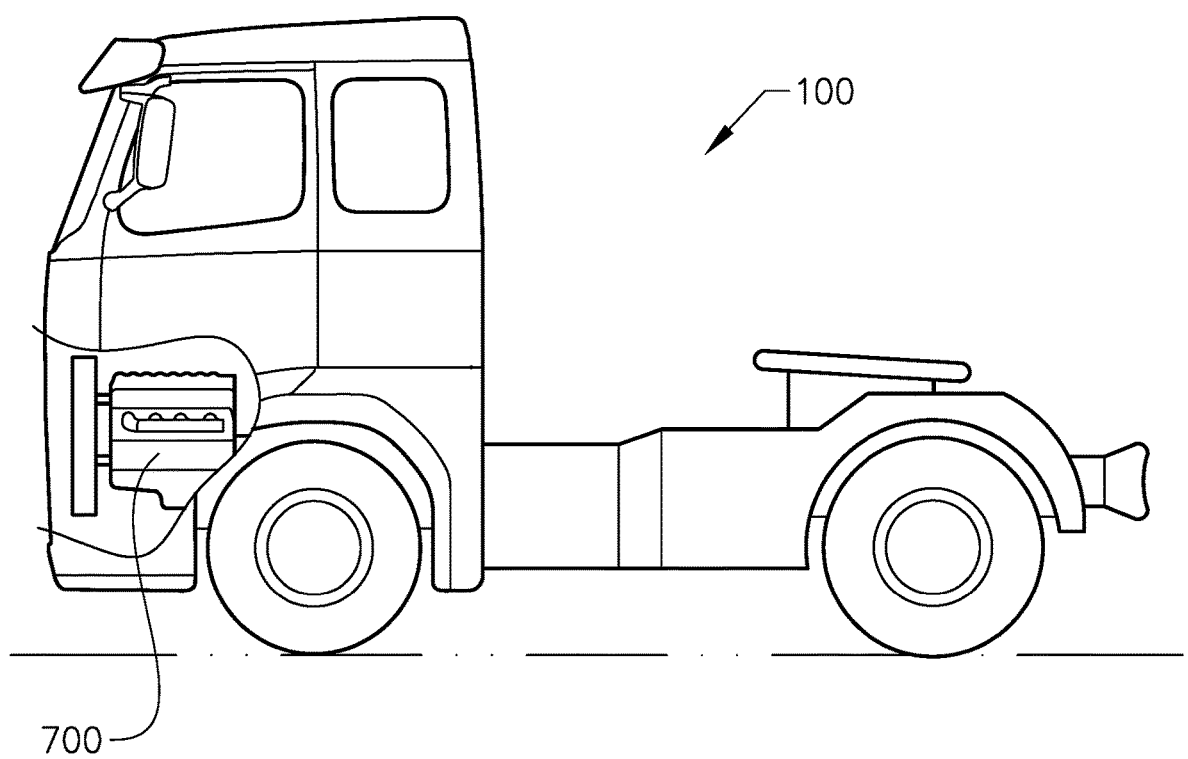
FIG. 1 illustrates an example of a vehicle with an internal combustion engine equipped with a valve arrangement.

The present invention will now be described more fully hereinafter with reference to the accompanying drawings, in which currently preferred embodiments of the invention are shown. This invention may, however, be embodied in many different forms and should not be construed as limited to the embodiments stet forth herein; rather, these embodiments are provided as illustrative examples. Like reference characters refer to like elements throughout.

FIG. 1 depicts an exemplary vehicle, here illustrated as a truck 100 comprising an engine 700 in which a valve arrangement according to the present invention may be incorporated. The valve arrangement may of course be implemented in other vehicles, such as a car or a working machine, or in any engine, such as a stationary engine.

The valve arrangement may be used in a combustion engine such as a conventional turbocharged diesel engine. In particular, each cylinder of the engine may comprise a valve arrangement according to the embodiments of the invention.

According to one exemplary method of operation, additional air is fed directly into the cylinders of an engine in connection with the take-off phase or when additional response from the engine is required, i.e. during the initial phase when it functions as an aspirating engine. This additional air is fed via a plurality of air passages, which lead up to the different cylinders. The feeding of ordinary and additional air to the different cylinders is done by means of at least one special valve arrangement which is provided at each of the different cylinders. Further details concerning such a valve arrangement and an engine comprising such a valve arrangement can be found in U.S. Pat. No. 6,138,616, hereby incorporated by reference.

Figure 2:
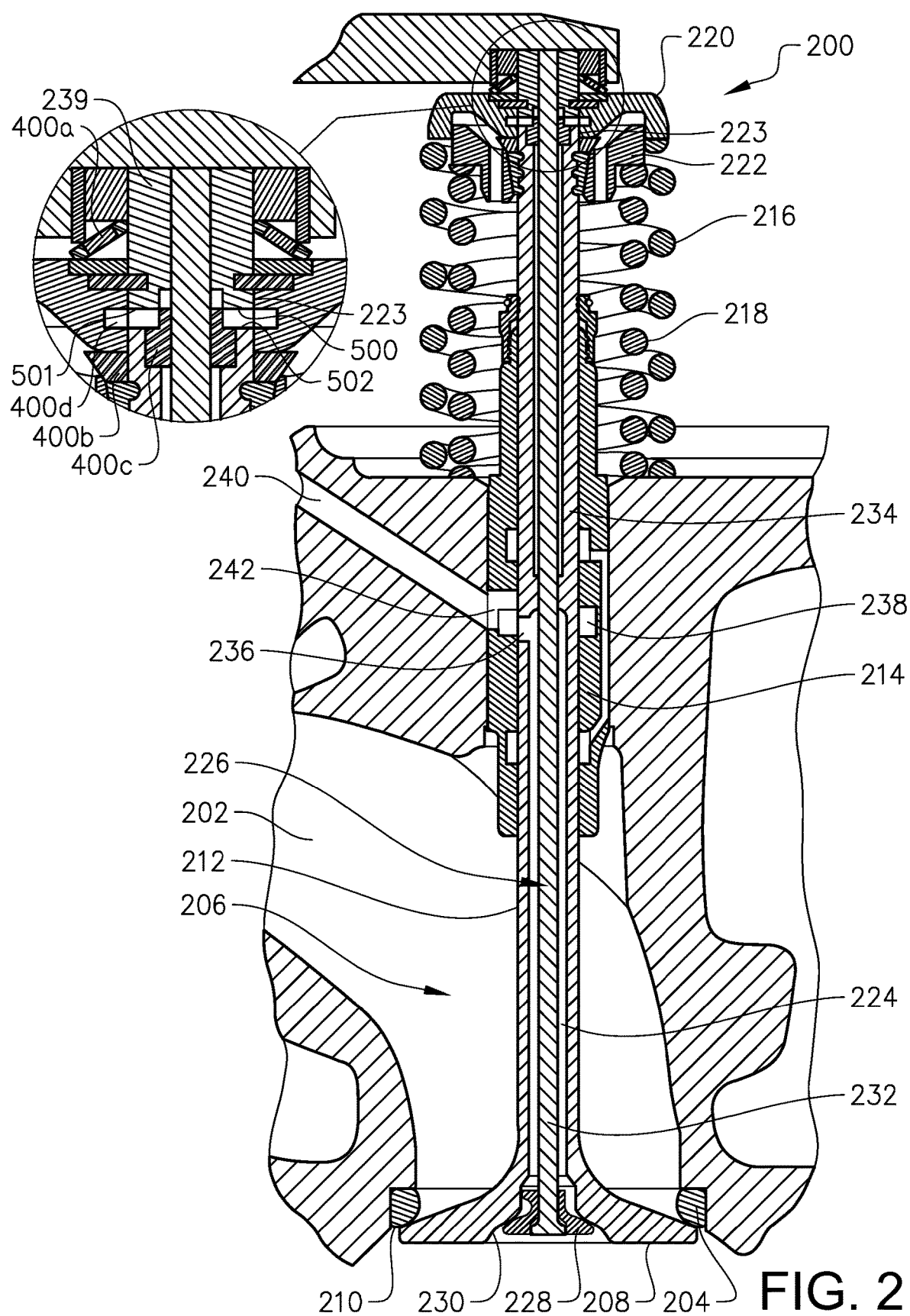
FIG. 2 illustrates a valve arrangement including embodiments of junction leakage preventing means.

Referring now to FIG. 2, the engine comprises a valve arrangement 200 arranged at an intake 202 of each cylinder of the engine. The intake 202 is used for feeding ordinary air to the cylinder. At the point where the intake 202 enters the cylinder, there is arranged a valve seat 204 against which a first valve 206 is arranged. To this end, the first valve 206 comprises a first valve head 208, which is in contact with a lower, essentially circular edge 210. The first valve head 208 is connected to a first valve-stem 212, which runs in an essentially jacket shaped valve guide 214. The function of the first valve 206 corresponds to the ordinary valve function of a diesel engine for the supply of ordinary air to the combustion in the different cylinders.

Using the force from an external valve spring 216 and an internal valve spring 218, the first valve head 208 is influenced to be in contact with the valve seat 204. To be more exact the first and second, external and internal, valve springs 216, 218 are in contact with, and press against, upper and lower, external and internal, spring washers 220, 222, respectively, where the lower spring washer 222, via a valve lock, is in connection with the first valve-stem 212. The lower part of the first valve stem assembly 212 is essentially tube-shaped, and comprises an internal cavity 224 extending in a longitudinal direction of the valve stem assembly 212. The internal cavity 224 is widened at its lower end. The internal cavity 224 houses a second valve 226 with a second valve head 228 which is in contact with a further valve seat in the form of an inner surface 230 of the first valve head 208. The second valve head 228 is furthermore connected to a second valve stem assembly 232 which has its extension inside the cavity 224.

The upper part of the first valve stem assembly 212 is shaped with a through-going passage-section 234, the inner dimensions of which essentially correspond to the outer dimensions of the second valve stem assembly 232. The internal cavity 224 in the lower part of the first valve stem assembly 212 has a diameter which is larger than the diameter of the second valve stem assembly 232 to allow a flow of additional air in the internal cavity 224. There is furthermore arranged along the circumference of the first valve stem assembly 212 at least one inlet 236, and especially a plurality of circumferentially spaced inlets. According to the example, three inlets are arranged equidistantly in the circumferential direction of the first valve stem assembly 212.

The valve guide 214 is essentially tubular and arranged to surround a portion of the first valve stem assembly 212, such that the first valve stem assembly 212 is movable in the valve guide 214 along a longitudinal direction between an upper closed position of the first valve 206, and a lower, open position.

The valve guide 214 is, in the illustrated embodiment, a one-piece unit.

The valve guide 214 comprises a recess 238 in an inner surface 244 for forming a space between the valve guide 214 and the first valve stem assembly 212. The valve guide 214 further comprises a valve guide air aperture 242 fluidly connecting the recess 238 with an outer surface 246 of the valve guide 214.

The recess 238 forms a groove with a main extension in a circumferential direction of the valve guide 214. More specifically, recess 238 forms a groove with a main extension in a direction perpendicular to an axial direction of the valve guide 214. More particularly, the groove 238 forms a continuous annular structure. In other words, the inner groove 238 can be seen to span the inner circumference of the valve guide. According to one example, the recess 238 is formed by machining the inner surface 244 from an interior of the valve guide 214.

The valve guide air aperture 242 is positioned relative to the recess 238 so that a surface 250 defining the recess in an axial direction 256 of the valve guide 214 is at the same distance or closer to a first end 252 of the valve guide 214 than a surface 248 defining the aperture 242 at the connection between the aperture 242 and the recess 238. In other words, the lower edge of the aperture 242 does not reach below the lower portion of the groove 238. Further, the aperture 242 is a hole with a circular cross section. More specifically, the aperture 242 is formed by a drilled hole. Preferably, an axis of the aperture 242 is perpendicular to an axial direction of the valve guide 214.

A feeder channel 240 is connected to the cavity defined by the recess 238 via the valve guide aperture 242 arranged in the side wall of the valve guide 214. It is preferable that the resulting ellipsoid opening of the feeder channel 240, adjacent to the valve guide aperture 242, is completely covered by the valve guide aperture 242. Moreover, the groove 238 is aligned with the valve guide aperture 242 configured to connect the cavity formed by the groove 238 to the feeder channel 240.

In the fully closed position of the valve arrangement 200, i.e. when the first valve 206 is in contact with the valve seat 204 and the second valve 226 is in contact with the inside of the first valve head 208, the cavity formed between the groove 238 of the valve guide 214 and the first valve stem assembly 212 is aligned with the at least one inlet 236 in the first valve stem assembly 212. In order to connect additional air to the cylinder there is furthermore provided a drilled feeder channel 240 which terminates at the valve guide aperture 242 in the valve guide 214.

As will be described in detail below, air can be supplied to the feeder channel 240 via a control valve and further on to the lower internal passage 224 of the first valve stem assembly 212. The additional air is thus led towards the engine cylinder via the second valve 226 which is continuously opened and closed by the camshaft, as will be described below. The second valve-stem 232 is at least along a certain section dimensioned so as to be a good fit against the lower end of the upper passage-section 234. This enables transfer of heat between the second valve-stem 232 and the first valve stem assembly 212, at the same time as it provides a sealing function which prevents air from flowing upwards along the upper passage-section 234. It also protects the second valve-stem 232 from the risk of buckling, especially during high engine speed operation.

During use of the valve arrangement, there is a risk that liquid, notably oil, will penetrate into the valve arrangement, causing problems for example due to residue build up (coking), which in turn may lead to decreased performance and increased wear of the valve arrangement.

One first region of the valve arrangement being susceptible to such oil penetration may be found at a junction between the first valve stem assembly 212 and the second valve stem assembly 232.

Figure 3A:
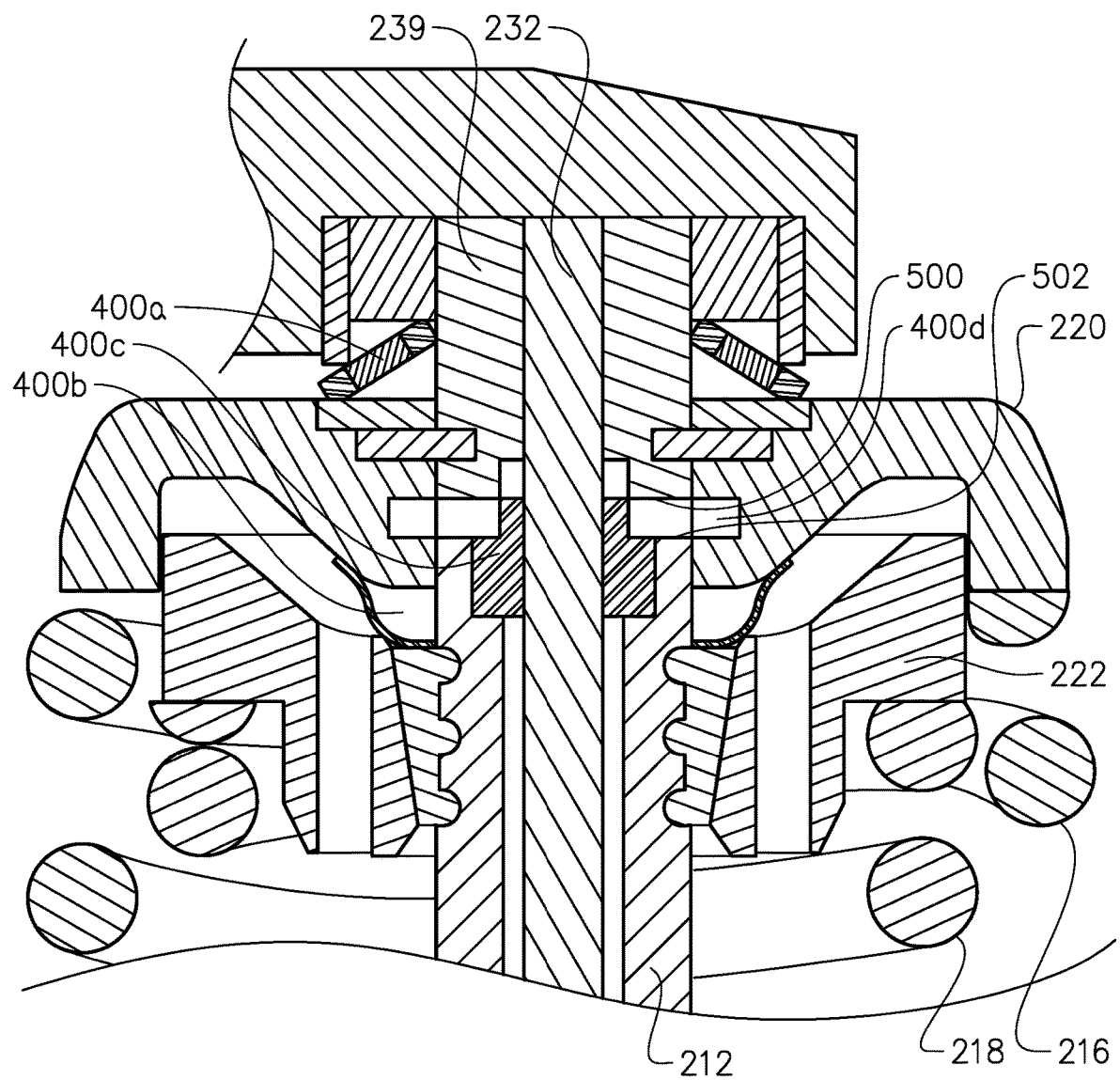
FIGS. 3a to 3b illustrate details of a valve arrangement according to the embodiment of FIG. 2.
Figure 3B:
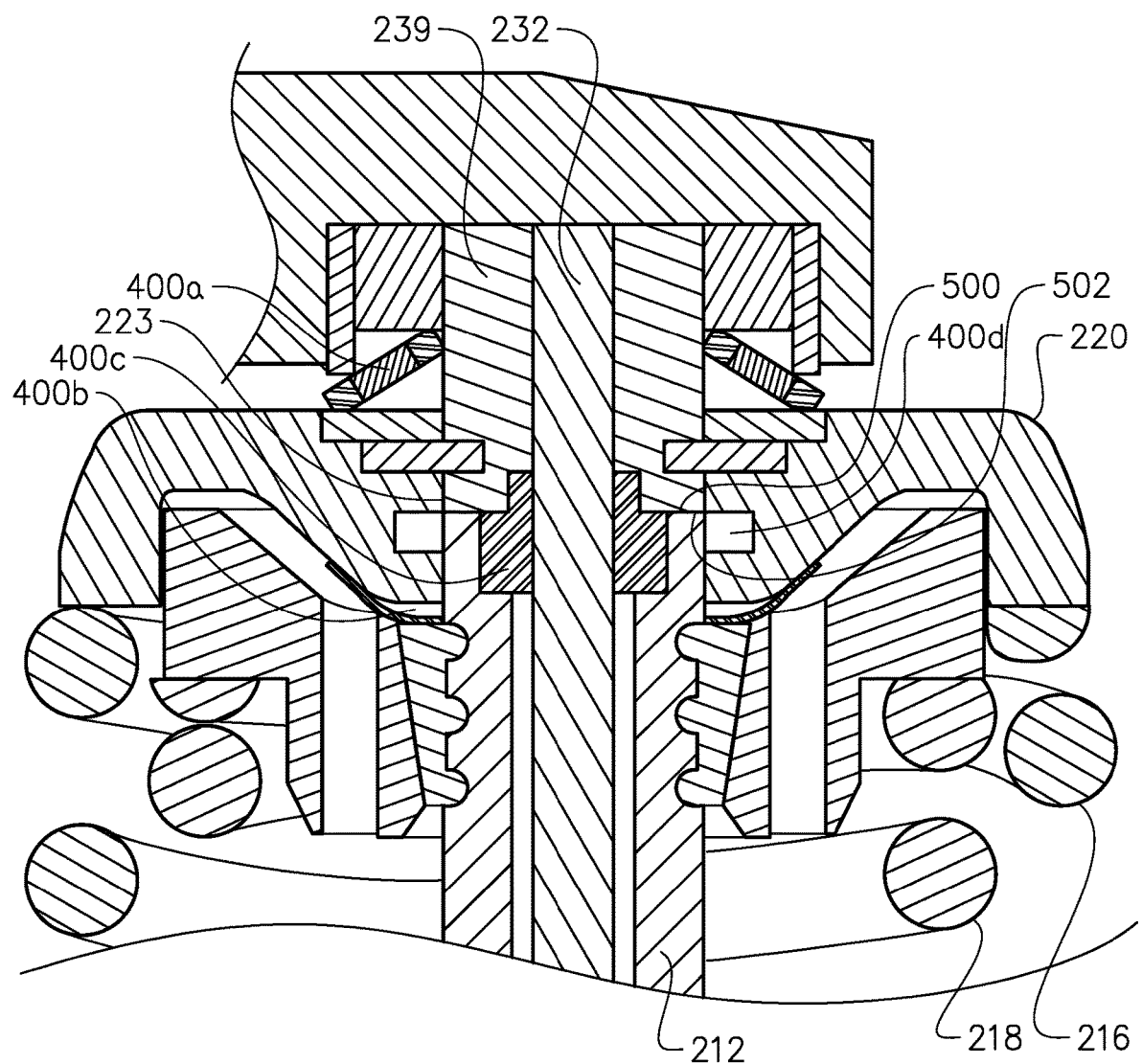

The portion of the valve arrangement of FIG. 2 surrounding the junction between the first and the second valve stem assemblies 212, 232 may be seen in an enlarged version in FIG. 3a, illustrating a closed condition of the second valve 226, and FIG. 3b, illustrating an open condition of the second valve 226.

As seen in FIG. 2, and in FIGS. 3a to 3b, the upper spring washer 220 forms a junction seal 223 extending over a junction between the first valve stem assembly 212 and the second valve stem assembly 232. Notably, the junction seal 223 extends over the junction when the second valve 226 is in its fully closed position, and when the second valve 226 is in its fully open position. The junction seal 223 is intended to hinder liquid from entering into a junction between the first valve stem assembly 212 and the second valve stem assembly 232, but should also enable the relative movement between the stems 212, 232 when the second valve 226 moves between an open and a closed position.

For improving the protection against leakage of any liquid from the outside of the junction seal 223 from reaching into the junction between the first valve stem assembly 212 and the second valve stem assembly 232, a junction leakage preventing means 400 may be arranged.

In the embodiment illustrated in FIG. 2, the valve arrangement comprises a stem joining device, 220, 222 extending between the first valve stem assembly 212 and the second valve stem assembly 232 and allowing relative movement between the first valve stem assembly 212 and the second valve stem assembly 232. Here, the stem joining device 220, 222 forms the junction seal 223.

In particular, the stem joining device comprises the upper washer 220 and the lower washer 222 as previously described, and, in the depicted embodiment, the upper washer 220 of the stem joining device forms the junction seal 223.

The upper washer 220 is arranged in connection to the second valve stem assembly 232, and the lower washer 222 is arranged in connection to the first valve stem assembly 212. Radially inner portions of the respective washers 220, 222 are thereby connected to the respective stems, 232, 212, whereas radially outer portions of the respective washers 220, 222 are in mutual contact during the movement of the second valve 226 between the open and the closed position.

The junction leakage preventing means 400 may comprise at least one member 400a, 400b, arranged on the outside of the junction seal 223, i.e. in the illustrated embodiment, on the outside of the upper washer 220.

A first example of such a junction leakage preventing means 400 is a member 400a, being arranged upwards of the junction seal 223, and sealing between the stem joining device and the second valve stem assembly 232, i.e. between the upper washer 220 and the second valve stem assembly 232.

FIG. 3a illustrates in more detail a member 400a arranged to seal between the upper washer 220 and the second valve stem assembly 232. The member 400a is in the form of a sealing member, extending circumferentially about the second valve stem assembly 232.

In the illustrated embodiment, the member 400a is an example of a junction leakage preventing means arranged on the outside of the junction seal 223, and on the outside of the stem joining device 220, 222.

In the illustrated embodiment, the valve stem assembly 232 comprise a stem tip 239 arranged at an upper end thereof. The stem tip 239 extends circumferentially about the valve stem assembly 232 per se, having a diameter corresponding approximately to the diameter of the first valve stem assembly 212. In this embodiment, the member 400a may be arranged to seal between the upper washer 220 and the stem tip 239. Naturally, other embodiments are possible, enabling the provision of additional sealing between the upper washer 220 forming the junction sealing 223 and the second valve stem assembly 232.

It will be understood that the provision of a sealing member 400 outside the stem joining device as described in the above is not necessarily dependent on all of the features of the illustrated embodiment. For example, a member 400 may be applied also to a valve arrangement lacking the junction seal 223, e.g. forming a seal between a stem joining device of some kind and the first or second valve stem assembly. That is, a member 400a as described in relation to the figures may be applied also to a valve arrangement lacking the junction seal 223, e.g. forming a seal between a stem joining device of some kind and the second valve stem assembly.

FIG. 2 and FIGS. 3a to 3b illustrate a second example of a junction leakage preventing means arranged on the outside of the junction seal 223, namely a member 400b, arranged between the upper washer 220 and the lower washer 222.

In the illustrated embodiment, the member 400b is an example of a junction leakage preventing means arranged on the outside of the junction seal 223, but on the inside of the stem joining device.

The member 400b illustrated in FIG. 2 and FIGS. 3a to 3b forms a sealing member forming a circumferential lip sealing between the upper washer 220 and the lower washer 222. Advantageously, the member 400b is compressible to allow for relative movement between the upper and lower washers 220, 222. Preferably, the sealing member 400b may be elastic.

It will be understood that the provision of a sealing member 400 inside the stem joining device as described in the above is not necessarily dependent on all of the features of the illustrated embodiment. For example, a member 400 may be applied also to a valve arrangement lacking the junction seal 223, e.g. forming a seal on the inside of a stem joining device of some kind and the first or second valve stem assembly. That is, a member 400b as described in relation to the figures may be applied also to a valve arrangement lacking the junction seal 223, e.g. forming a seal between a stem joining device and the first valve stem assembly.

Alternatively or in addition to the above, the junction leakage preventing means for hindering liquid from the outside of the junction seal 223 from reaching in between the first valve stem assembly 212 and the second valve stem assembly 232 may comprise at least one member 400c, 400d, being arranged on the inside of the junction seal 223.

For example, the function leakage preventing means may comprise a member 400c being a sealing member arranged between the first valve stem assembly 212 and the second valve stem assembly 232. The sealing member 400c is arranged so as to bridge between the first valve stem assembly 212 and the second valve stem assembly 232 when the second valve 223 is in a closed position.

FIG. 3a and FIG. 3b illustrates an example of such a member 400c, being arranged in a central recess in an upper end of the first valve stem assembly 212. The member 400c hence surrounds the second valve stem assembly 232. The second valve stem assembly 232 protrudes upwards beyond an upper end surface of the first valve stem assembly 212. The second valve stem assembly 232 is provided with a tip 239 forming a lower abutment surface 500, which is arranged to face the upper end surface 502 of the first valve stem assembly 212.

The valve tip 239 is provided with recess adapted to receive the protruding portion of the member 400c, such that in a closed position the protruding portion of the member 400c is introduced in the recess of the valve tip 239.

Figure 3C:
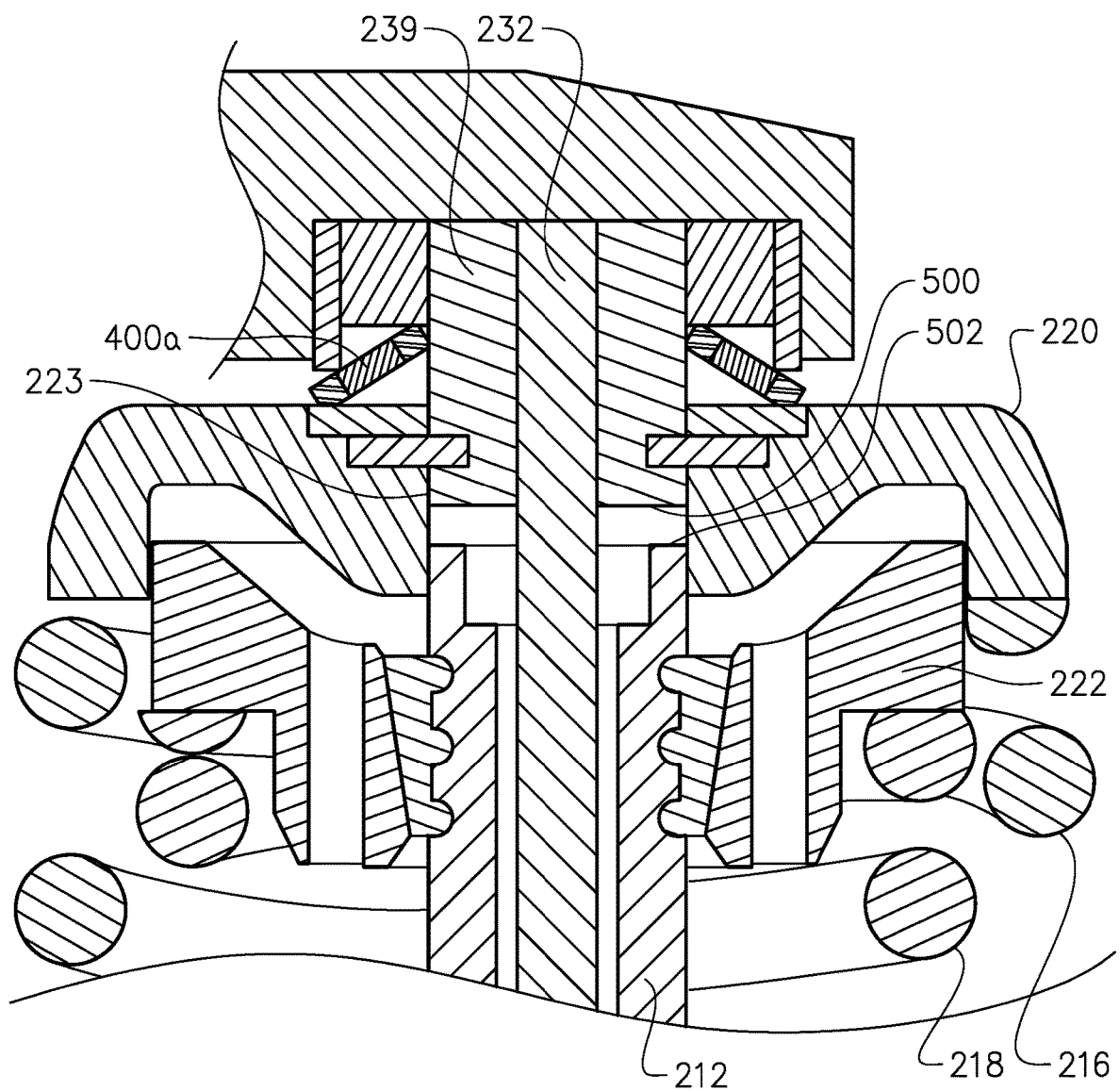
FIGS. 3c to 3e illustrate variants of the arrangement of FIGS. 3a to 3b

In FIG. 3c, the second valve 226 is in a closed position, and a gap is formed between the tip 239 of the second valve stem assembly 232 and the first valve stem assembly 212. As may be seen in FIG. 3c, in the illustrated embodiment, the member 400c is arranged such that its protruding portion protrudes beyond the upper end surface of the first valve assembly 212 and to the rim of the recess in the tip 239, i.e. the when the second valve 226 is in its fully closed position, the member 400c is arranged to bridge between the first and second valve stem assemblies 212, 232.

FIG. 3b illustrates an open position of the second valve 226, wherein the lower abutment surface 500 of the tip 239 of the second valve stem assembly 232 abuts the upper surface 502 of the first valve stem assembly 212. In the illustrated embodiment, the valve tip 239 is provided with recess corresponding to the size and shape of the protruding portion of the member 400c, such that in a fully open position of the valve, the entire member 400c is confined between the first valve stem assembly 212 and the tip 239 of the second valve stem assembly, and the abutment surfaces 500, 502 of the tip 239 and the first valve stem assembly 212 may meet, closing said gap.

Alternatively, the recess in the valve tip 239 may be made slightly larger than the protruding portion of the member 400c.

Optionally, the member 400c may at least partially extend at least one of the abutment surfaces 500, 502, so that in a fully open position of the second valve 226, at least a portion of the member 400c will be pressed between the abutment surfaces 500, 502.

It will be understood that the provision of a sealing member 400c as described in the above is not necessarily dependent on all of the features of the illustrated embodiment. For example, a member 400c may be applied also to a valve arrangement lacking the junction seal 223, or lacking the stem joining device.

Further, FIGS. 3a and 3b illustrates a second example of a junction leakage preventing means being arranged on the inside of the junction seal 223.

As previously explained, the junction seal 223 may be formed e.g. by the upper washer 220, being in contact with both the second valve stem assembly 232 via the tip 239, and the first valve stem assembly 212.

As illustrated in FIGS. 3a and 3b, a member in the form of a circumferential cavity 400d may be arranged in the junction seal 223, the circumferential cavity 400d opening towards the junction between the first and the second valve stem assembly 212, 232.

In the illustrated embodiment, the cavity 400d is open towards the gap formed between the valve tip 239 and the upper end surface of the first valve stem assembly 212, when the second valve 226 is in a closed position.

When the valve arrangement 200 is in use, the presence of the cavity 400d will influence the pressure fluctuations created during the movement of the second valve stem assembly 232 in relation to the first valve stem assembly 212. Accordingly, pressure fluctuations tending to draw liquid into a region between the first 212 valve stem assembly and the second valve stem assembly 232 may be counteracted.

It will be understood that the provision of a sealing member 400d as described in the above is not necessarily dependent on all of the features of the illustrated embodiment.

In the embodiment of FIGS. 2, 3a to 3b, no less than four different junction leakage preventing means 400a, 400b, 400c, and 400d are provided, as explained in the above. However, other embodiments are possible comprising one, two or more junction leakage preventing means.

FIG. 3c illustrates an embodiment comprising a single junction leakage preventing means in the form of the sealing member 400a. Accordingly, this is an example of an embodiment comprising a junction leakage preventing means arranged on the outside of the stem joining device 220, 222 only. The junction leakage preventing means is provided outside the junction seal 223. The function of the single junction leakage preventing means 400a of FIG. 3c is similar to that of the means 400a of FIGS. 3a-3b.

Figure 3D:
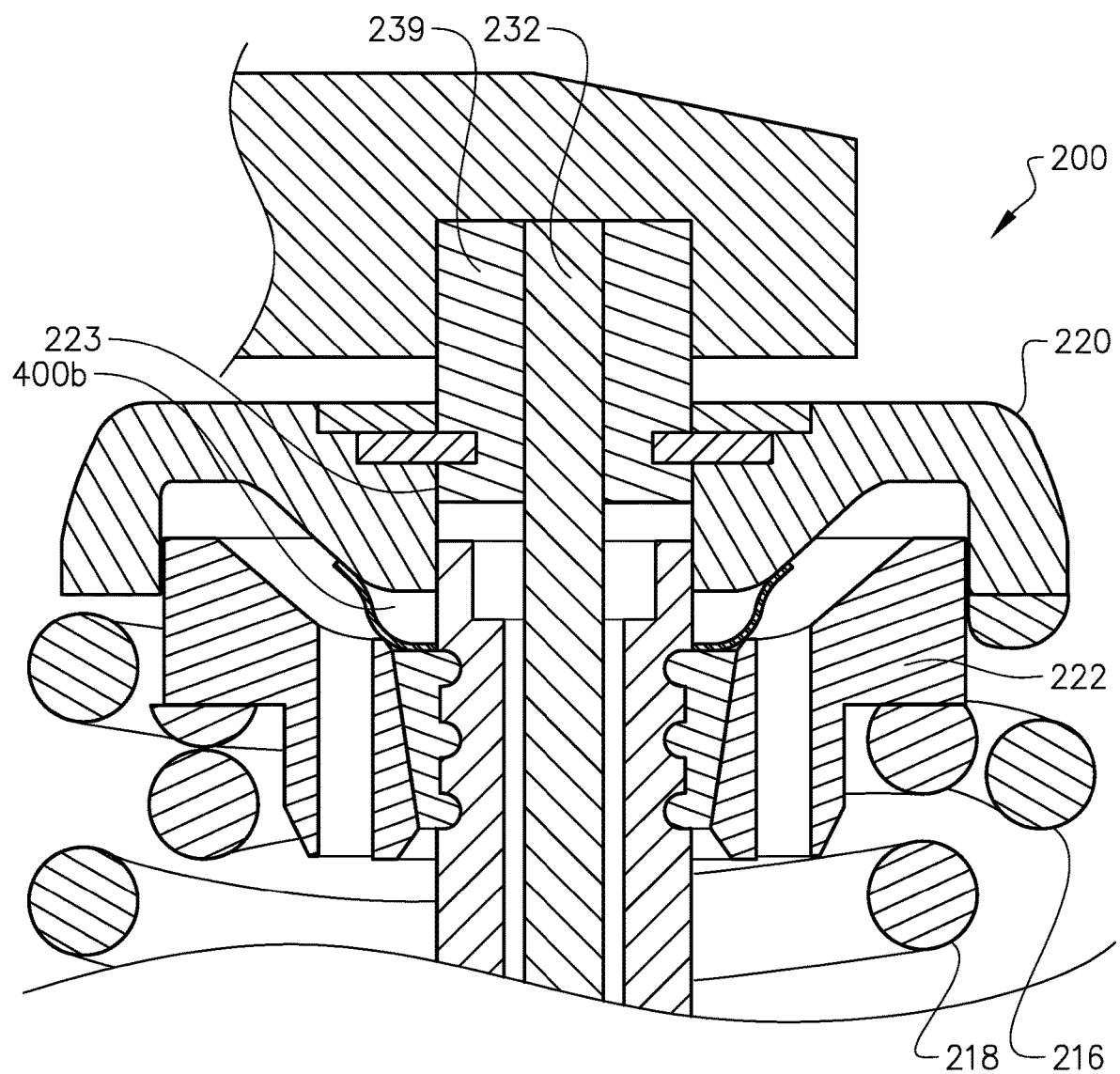

FIG. 3d illustrates an embodiment comprising a single junction leakage preventing means in the form of the member 400b. Accordingly, this is an example of an embodiment comprising a junction leakage preventing means arranged inside the stem joining device 220, 222 only. The junction leakage preventing means is arranged outside the junction seal 223. The function of the single junction leakage preventing means 400b of FIG. 3d is similar to that of the means 400b of FIGS. 3a-3b.

In another embodiment, the junction leakage preventing means of FIGS. 3c and 3d may be combined, resulting in a valve arrangement 200 comprising a junction leakage preventing means 400a arranged outside the junction seal 223, and a junction leakage preventing means 400b arranged inside the junction seal 223.

Figure 3E:
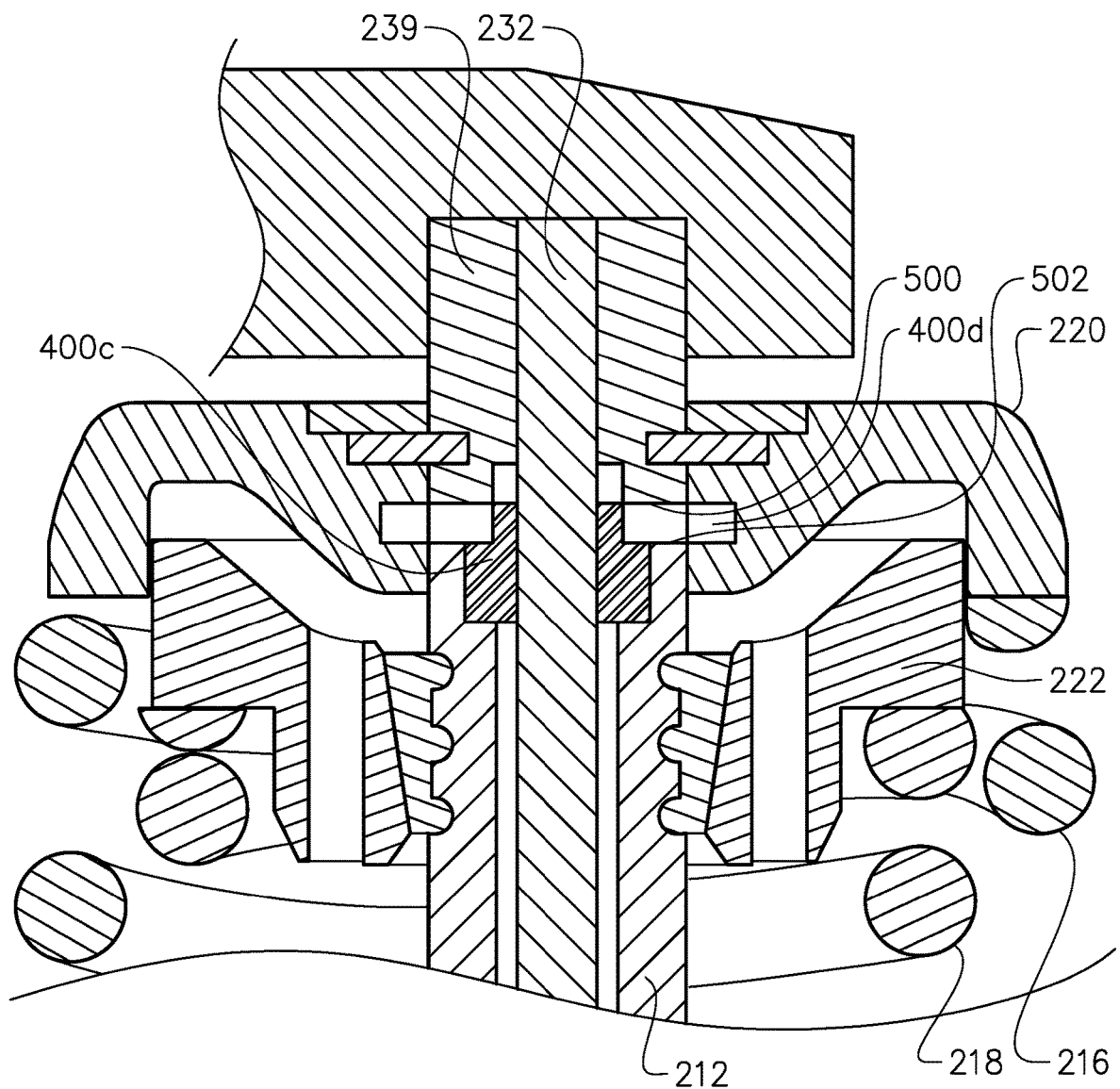

FIG. 3e illustrates an embodiment comprising junction leakage preventing means 400c, 400d arranged inside the junction seal 223 only. In this embodiment, a junction leakage preventing means 400c comprising a seal arranged to bridge a gap between the first and second valve stem assemblies 212, 232 when in a closed position, and a junction leakage preventing means 400d comprising a cavity in the junction seal 223 are both arranged. The function of the respective junction leakage preventing means 400c, 400d is similar to what is described in relation to FIGS. 3a-3b.

In other embodiments, only one out of the junction leakage preventing means 400c, 400d may be arranged as a single junction leakage preventing means.

Also, it will be understood that the embodiments of junction leakage preventing means may be combined in various manners.

For example, a combination including at least one junction leakage preventing means arranged inside the junction seal 223, and at least one junction leakage preventing means arranged outside the junction seal 223 may be provided.

Alternatively, or in addition to the junction leakage preventing means 400 as described in the above, guide leakage preventing means 300' may be provided for preventing leakage of any liquid from the outside of the first valve stem assembly 212 from reaching the valve guide air inlet 242 and/or the at least one air inlet 236 of the first valve 206.

In the below, for better visibility, description of examples of guide leakage preventing means 300, will be made in relation to FIGS. 4-5. However, all combinations of the features depicted in any of FIGS. 2-5 are possible, and are to be part of the present disclosure.

Figure 4:
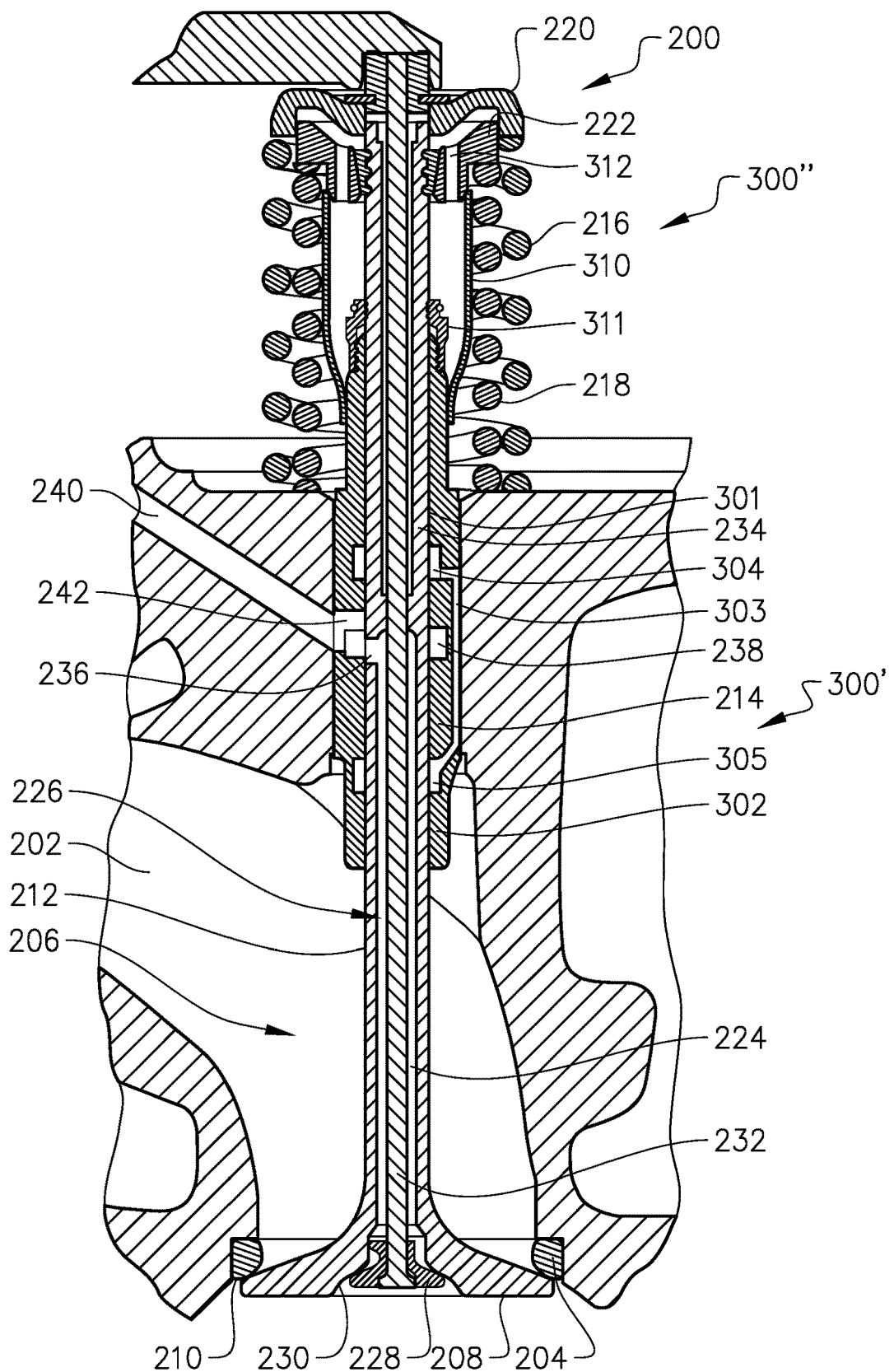
FIG. 4 illustrates a valve arrangement comprising embodiments of guide leakage preventing means.
Figure 5:
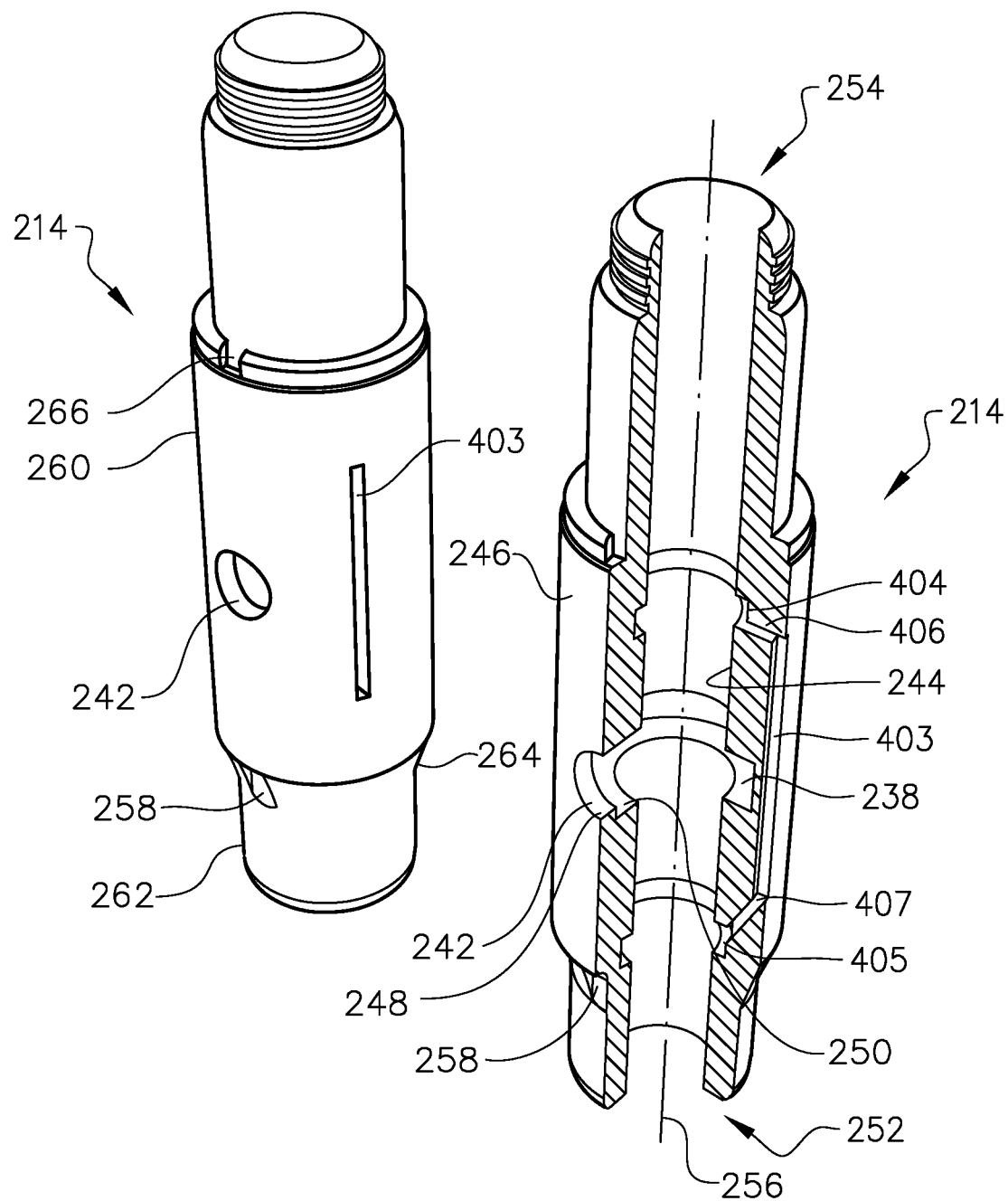
FIG. 5 illustrates an embodiment of a valve guide which may be used with the valve arrangement of FIG. 4.

As illustrated in FIG. 4, the guide leakage preventing means 300' comprises a liquid drainage means 300' for draining liquid from a region 301 between the first valve stem assembly 212 and the valve guide 214, located longitudinally above the valve guide air passage 242.

The inlet liquid drainage means 300' is arranged to drain liquid from the region 301, to another region 302 located longitudinally below the valve guide air passage 242.

To this end, the inlet liquid drainage means 300' comprises a bypass channel 303 for draining liquid past the valve guide air passage 242 in the longitudinal direction. The bypass channel 303 is in the illustrated embodiment in the form of a longitudinally extending outer groove in an outer surface of the valve guide 214.

To collect liquid in the region 301 upstream of the valve guide air passage 242, a liquid collection volume 304 is arranged. In the illustrated embodiment, the liquid collection volume 304 is in the form of an internal groove, extending circumferentially about an inside of the valve guide 214.

The liquid collection volume 304 is connected to the bypass channel 303 such that liquid collected therein may be drained via the bypass channel 303 past the valve guide air passage 242.

Moreover, in the illustrated embodiment, a second liquid collecting volume 305 is arranged longitudinally downwards of the valve guide air passage 242. The second liquid collecting volume 305 is, in the illustrated embodiment, in the form of an internal groove, extending circumferentially about an inside of the valve guide 214.

FIG. 5 illustrates an embodiment of the valve guide 214, seen in a perspective view as well as in a partially cut-out view for enabling better visibility of some of the features.

In FIG. 5 it may be seen how the bypass channel 303 in the form of a longitudinally extending external groove 403 in the valve guide 214 is visible from the outside of the valve guide 214. The groove 403 is connected to a first inner circumferential groove 404, forming the first liquid collection volume 304 and to a second inner circumferential groove 405, forming the second liquid collection volume 305, via connections 406 and 407.

It will be understood that the shape and size of the bypass channel 303 and/or the liquid collection volumes 304, 305 may be varied. For example, the bypass channel 303 may be formed as a passage completely enclosed in the wall formed by the valve guide 214. Moreover, the bypass channel may comprise a plurality of grooves. Also, the bypass channel may be formed by a generally planar surface portion forming an indentation in an otherwise generally circular outer surface of the valve guide 214.

Further, in the illustrated embodiment the valve guide 214 comprises a guide means 258 adapted for guiding the valve guide to a circumferential position inside of a housing in which the aperture 242 coincides with a feeder channel 240. Especially, the guide means 248 is positioned at a lower portion of the valve guide 214 for engagement with an external tool during assembly.

Furthermore, in the illustrated embodiment a first portion 260 of the valve guide comprising the aperture 242 has a first diameter, and a second portion 262 of the valve guide located adjacent to the first end 252 of the valve guide has a second diameter smaller than the first diameter, thereby forming a tapered transition region 264 between the first portion 260 and the second portion 262. The guide means 258 is here embodied by a triangular notch 258 in the tapered region, wherein the notch 258 has a circumferential position which is aligned with a circumferential position of the aperture 242. The notch 258 has a flat surface in a direction parallel with the axial direction 256 of the valve guide 214, such that an engagement member of an assembly tool can be moved towards the surface of the notch 258 and recognize when the engagement member makes contact with the flat surface. Thereby, the assembly tool can verify that the valve guide is in the correct position before the pressing the valve guide into the cylinder head. The guide means 258 may also have the form of groove, a trench or the like allowing the engagement of an external tool during assembly of a valve arrangement.

The valve guide also comprises an alignment mark 266 located between the aperture 242 and a second end 254 of the valve guide, wherein the alignment mark is configured to be visible when the valve guide is assembled in a valve arrangement. The alignment mark 266 is here illustrated as a notch 266 having a circumferential position aligned with a circumferential position of the aperture 242.

Returning to FIG. 4, in this illustrated embodiment of a valve guide arrangement 200, an additional guide leakage preventing means 300" is provided for preventing liquid from leaking from a region externally of the first valve stem assembly 212 to the valve guide air passage 242.

This guide leakage preventing means comprises a member 300" for preventing fluid from entering the region 301 between the first valve stem assembly 212 and the valve guide 214.

The first valve stem assembly 212 is arranged to extend upwardly from the valve guide 214, whereby liquid may risk entering into a junction between the inside of valve guide 214 and the external side of the first valve stem assembly 212.

In the illustrated embodiment, a guide sealing 311 is arranged to seal the junction between the valve guide 214 and the first valve stem assembly 212. To further reduce the risk of liquid entering between the valve guide 214 and the first valve stem assembly 212, the fluid entry preventing means 300" is arranged so as to extend longitudinally over the junction between the valve guide 214 and the first valve stem assembly 212.

In particular, the guide leakage preventing means 300" may be arranged so as to extend longitudinally over the guide sealing 311.

In the illustrated embodiment, the guide leakage preventing means 300" comprises a skirt 310 extending circumferentially about, and longitudinally over, the junction formed between the valve guide 214 and the first valve stem assembly 212. To this end, the skirt 310 may extend over at least a portion of the valve guide 214. In the illustrated embodiment, the skirt 310 extends longitudinally between the lower spring washer 222 and the valve guide 214.

Accordingly, the illustration is an example of a guide leakage preventing means extending from a stem joining device 220, 222 to the valve guide 214.

The function of the valve arrangement will now be described with reference to FIG. 2 (or 4) and FIGS. 6A-E which schematically illustrate the different stages when supplying air to the different cylinders.

FIGS. 6A-6E are simplified in that they do not disclose any junction leakage preventing means 400 as illustrated in FIGS. 2-3, or any guide leakage preventing means 300' and 300" as illustrated FIGS. 4-5. It will however be realized that the general intended operation of the valve arrangement as described in connection to FIGS. 6A to 6E is not affected by the presence of the junction leakage preventing means or the guide leakage preventing means, which is why the FIGS. 6A-6E are suitable for the purpose of a general description.

FIGS. 6A-6E show the intake stroke in a cylinder 302 which is equipped with the valve arrangement 200. As is first shown in FIG. 6A, the piston 304 of the cylinder 302 is in its upper position in the cylinder 302. The piston 304 is, in a conventional manner connected to the crankshaft 306 via a connecting rod 308. In this upper position the first valve 206 is in contact with the valve seat 204 due to the spring-force from the spring 218. Furthermore, the second valve 226 is in contact with the inside 230 of the first valve head 208 due to the spring-force from the spring element 216.

Figure 6A:
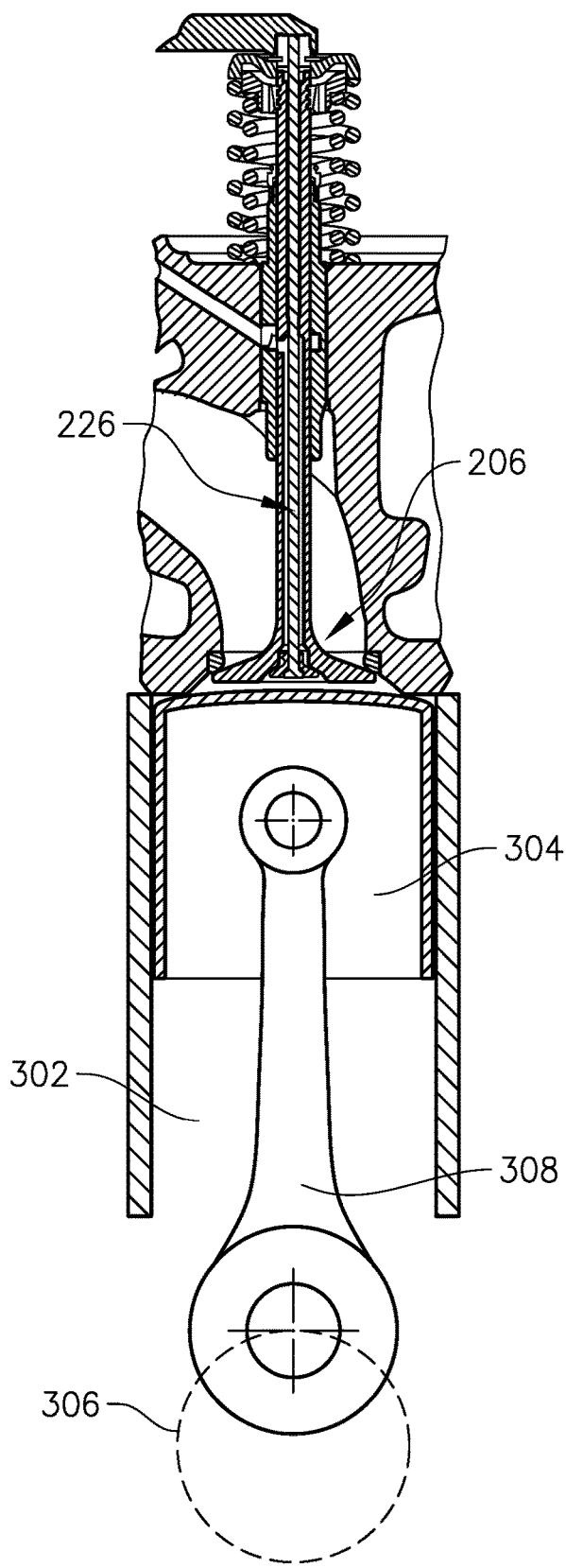
FIGS. 6A-E illustrate schematically a valve arrangement during the different stages when supplying air to a cylinder.
Figure 6B:
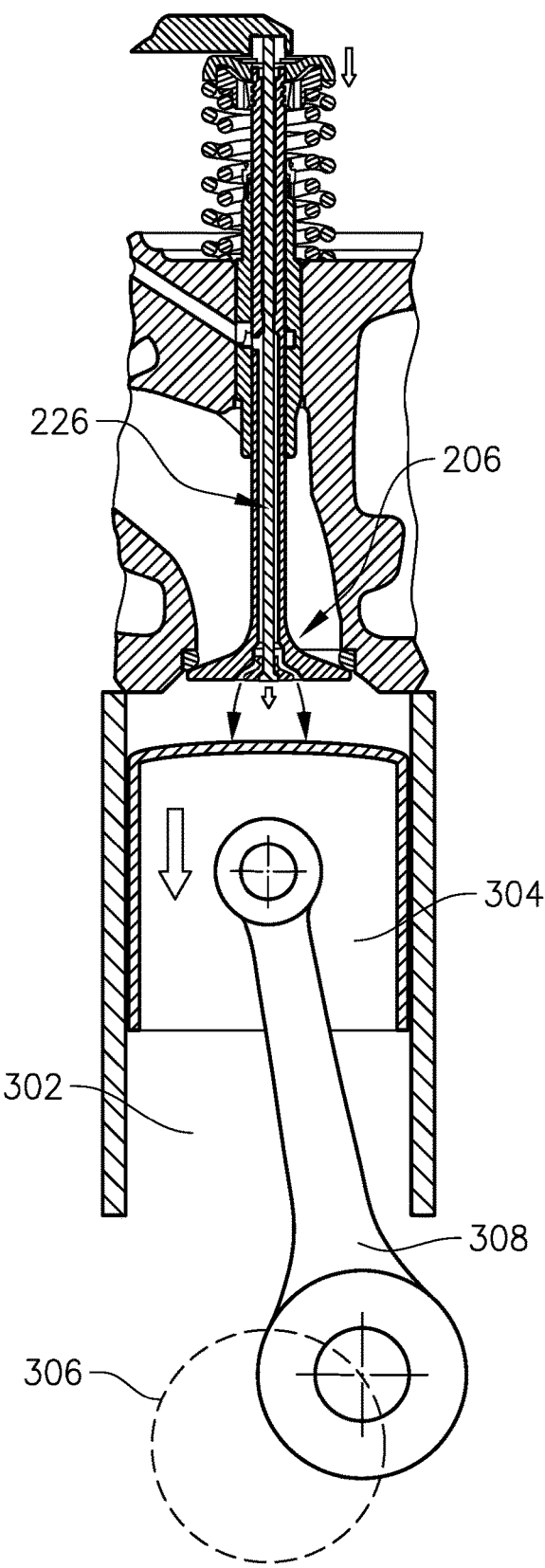

In the next phase, as shown in FIG. 6B, the piston 304 moves downwards. At the same time the valve arrangement 200 is influenced by the camshaft of the engine (not shown). Thus, the spring-force of the external spring 216 will first be exceeded, which leads to the second valve 226 being pressed a small distance downwards, whereby the second valve head 228 is lifted out of contact with the inside 230 of the first valve head 208. If the conditions for feeding additional air via the feeder channel 240 are fulfilled, and air has been fed to the internal passage 224, a marginal amount of additional air will now during a short time be fed to the cylinder 302, until the inlet is blocked by the lower part of the valve guide as a consequence of the opening of the first valve 206, i.e. the main inlet valve. Here, it can also be seen that the second valve head 228, when in an open position, does not protrude past an end face of the first valve head 208.

Figure 6C:
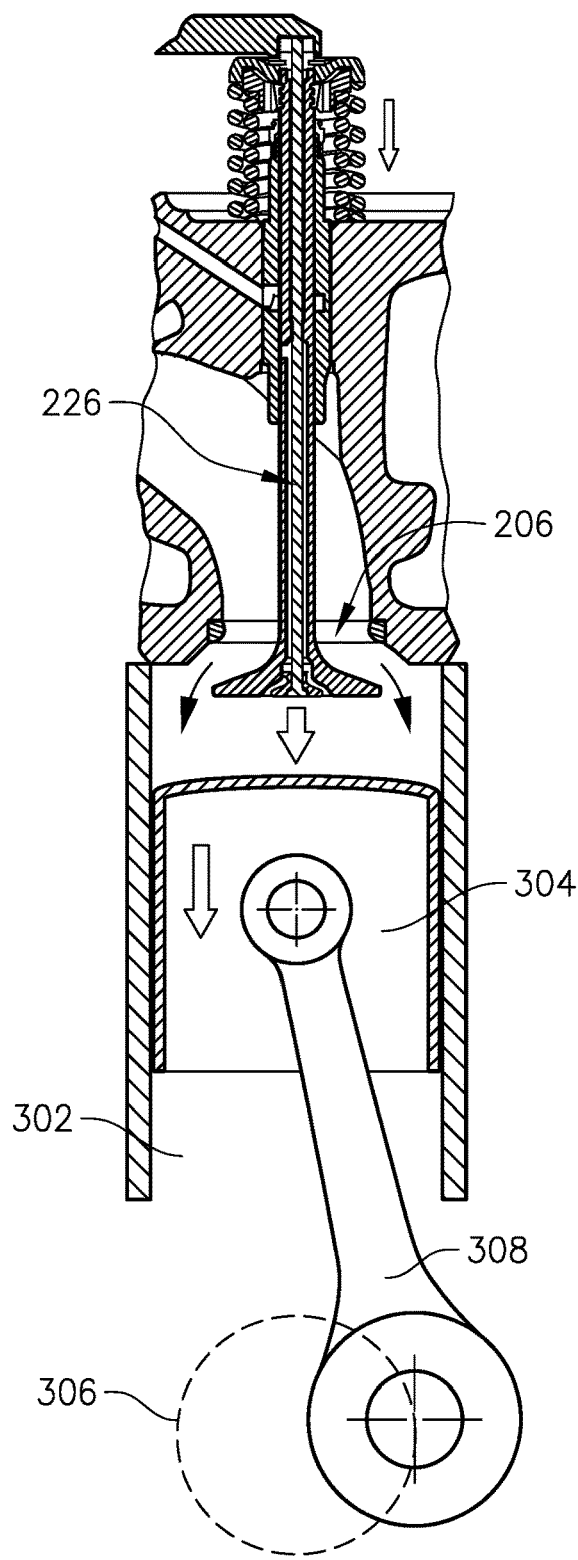

FIG. 6C shows the following phase in which the piston 304 is on its way down and the first valve 206 has been lifted out of the valve seat 204. At this phase, the ordinary air is aspirated into the cylinder 203 via the intake 202 in the cylinder head. Furthermore, the first valve stem 212 has been displaced/opened a distance downwards relative the valve guide 214. This means that the at least one inlet 236 is no longer aligned with the groove 238 or the valve guide aperture 242, which causes the feeder channel 240 to be out of communication with the internal passage 224 of the first valve 206. This in turn means that no additional air is supplied during this phase, when the first valve 206 is open.

Figure 6D:
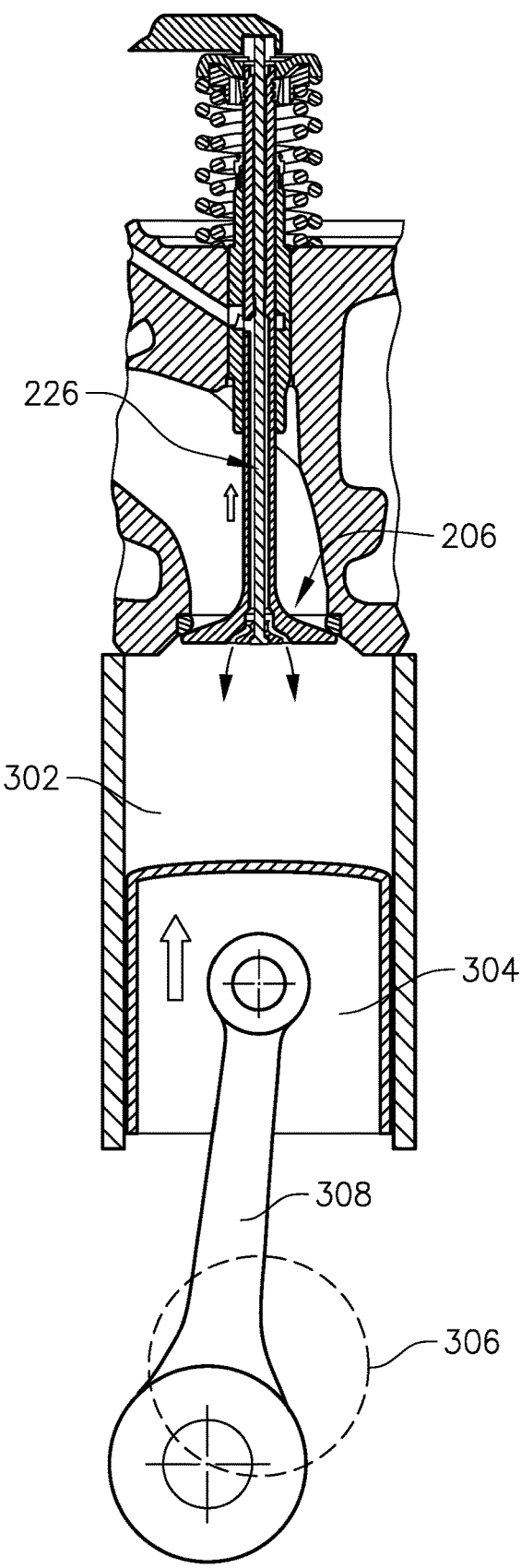

In the next phase, which is shown in FIG. 6D, the piston 304 has just passed its lowest position and is on its way upwards in the beginning of the compression stroke. Furthermore, the camshaft of the engine has influenced the valve arrangement 200 to be moved towards its initial position, so that the first valve 206 is now closed, i.e. the first valve head 208 is in contact with the valve seat 204. According to the invention, the camshaft is so arranged that the second valve head 228 has not yet come into contact with the first valve head 208, i.e. the second valve 226 is still open. Furthermore, the first valve-stem 212 in this phase is in such a position that the at least one inlet 236 is essentially aligned with the groove 238, which causes additional air to now be fed to the cylinder 302 via the passage defined by the internal passage 224. In this way, the first valve 206 will thus be closed and the second valve 226 will be open for the supply of additional air, which takes place during the beginning of the compression phase and after the first valve 206 is closed. The duration of this sequence of events (i.e. the supply of additional air) is controlled by the shape of the inlet lobe of the camshaft, as will be described in detail below in relation to FIG. 5A. The duration also depends on the positioning of the inlet 236 in relation to the groove 238.

Figure 6E:
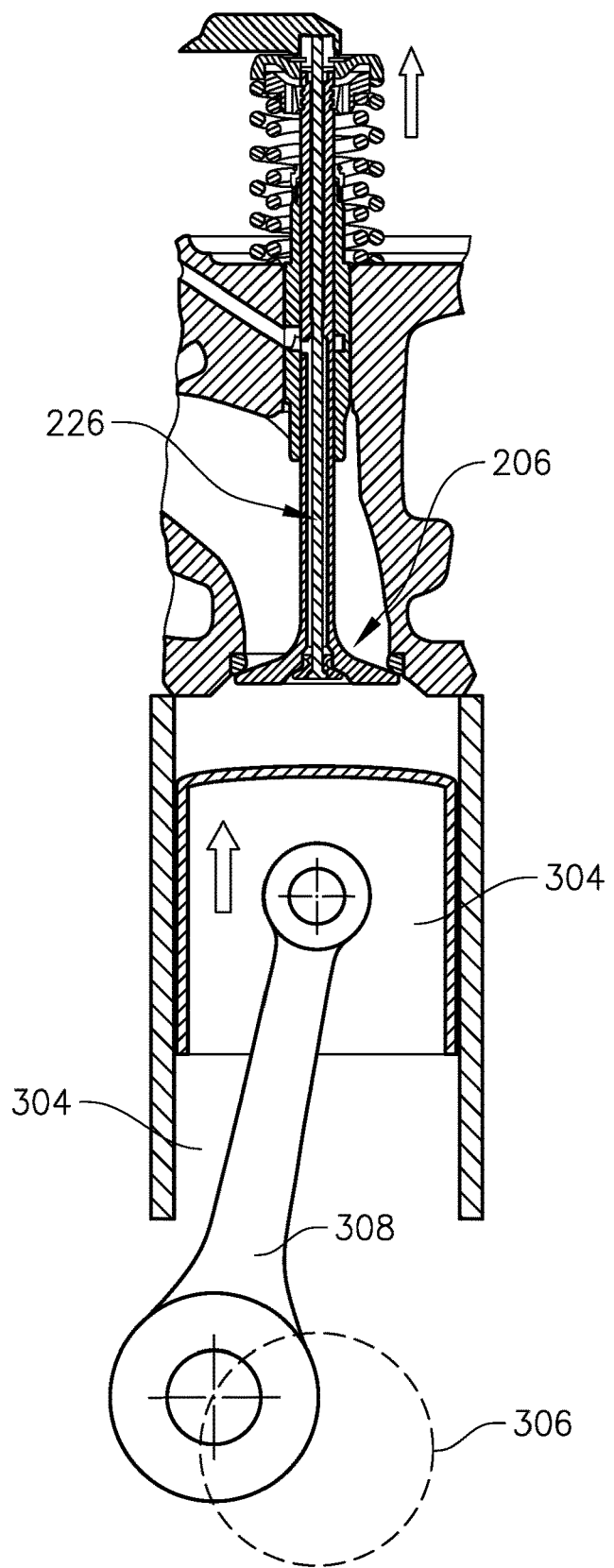

Finally, FIG. 6E shows that the second valve stem assembly 232 and thus also the second valve head 228 has been released upwards, so that the second valve 226 is closed, i.e. the second valve head 228 is in sealing contact with the inside 230 of the first valve head 208. The spring element 216 is here so dimensioned that its spring-force, which attempts to close the second valve 226, exceeds the force with which the air pressure in the internal passage 224 affects the second valve 226. Subsequent to this final phase, the compression stroke is in a known manner started and a larger amount of fuel can be supplied, since a certain amount of additional air now has been fed into the cylinder 302.

Figure 7A:
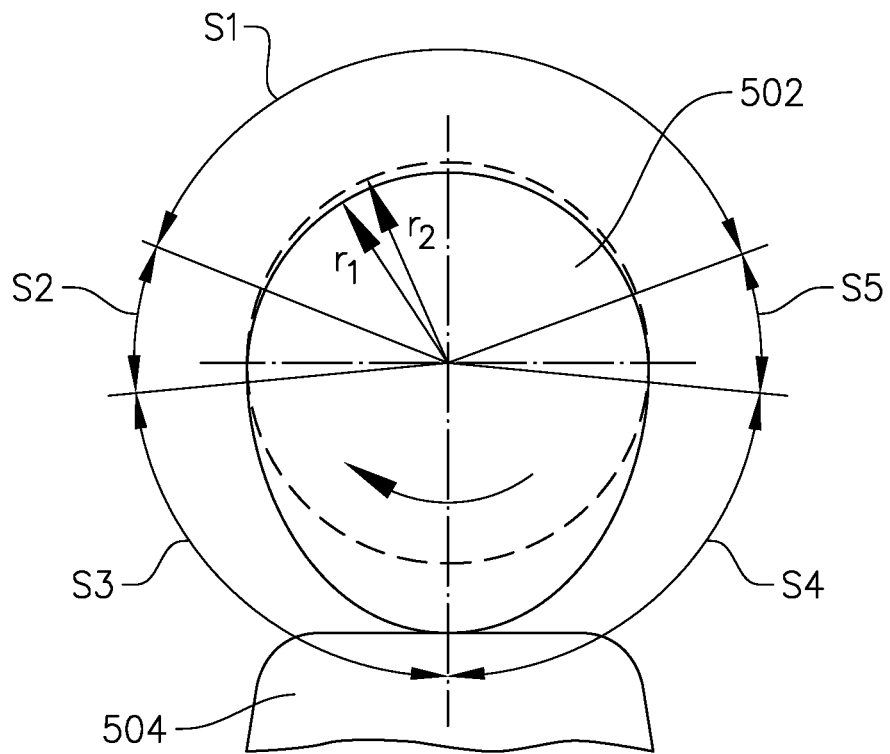
FIG. 7A illustrates schematically a camshaft for use with a valve arrangement.

FIG. 7A shows a schematic cross-section of a camshaft 502 which can be used in connection with the invention. In a way which as such is known, and which is not shown in detail, the engine is used to drive the camshaft 502. The camshaft 502 affects a valve lifter 504, which in turn causes the valve arrangement 200 to open and close. FIG. 5A shows the radius r1 of the camshaft 502 with a solid line, while the radius r2 of a basic circle is indicated with a broken line. FIG. 5A also shows in principle five different angle-sectors S1, S2, S3, S4, S5, which correspond to the different phases as shown in FIGS. 4A-E. Angle-sector S1 thus corresponds to what is shown in FIG. 6a i.e. the valve arrangement 200 is closed, i.e. both the first valve 206 and the second valve 226 is closed. Angle-sector S2 corresponds to what is shown in FIG. 6B i.e. the second valve 226 is open while the first valve 206 is closed. A marginal addition of air to the cylinder takes place during a short amount of time here when air is supplied. Furthermore, angle-sector S3 corresponds to that shown in FIG. 6C, i.e. the first valve 206 is open but no additional air is supplied since the inlet 236 is not aligned with the groove 238. During angle-sector S4 the first valve 206 starts to close. Finally, angle-sector S5 corresponds to FIG. 6D, i.e. a position where the first valve 206 is closed but the second valve 226 is still kept open. This angle-sector S5 in this manner forms a "plateau" with an essentially constant radius of the camshaft 502 with additional air being supplied to the different cylinders. By varying the size of this angle-sector us, the period of time during which additional air is supplied can be varied, thereby controlling the lift curve of the valve arrangement. The disclosed valve lift curve is a unique low cost feature for the valve arrangement according to embodiments of the invention to maneuver two functions with one modified lift curve for maximum synchronization and control of the motion between the two valves.

Figure 7B:
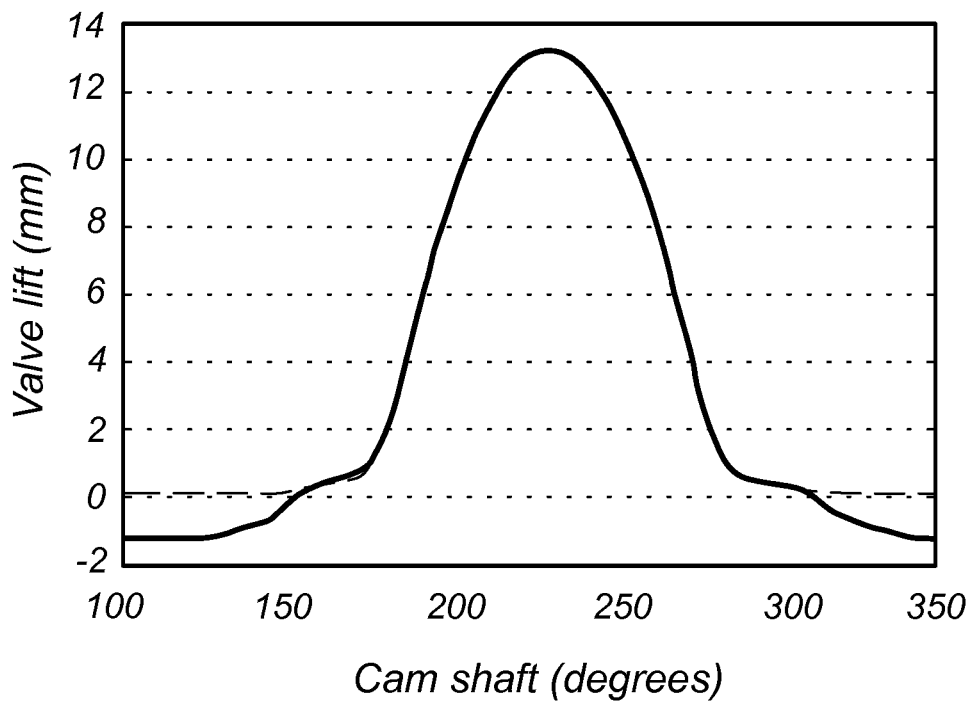
FIG. 7B illustrates schematically an example of a lift curve for the camshaft of FIG. 7A.

FIG. 7B schematically illustrates a lift curve (solid) for the camshaft 502 described in FIG. 7A. The lift curve is compared to a lift curve (dashed) for a conventional camshaft.

Figure 8:
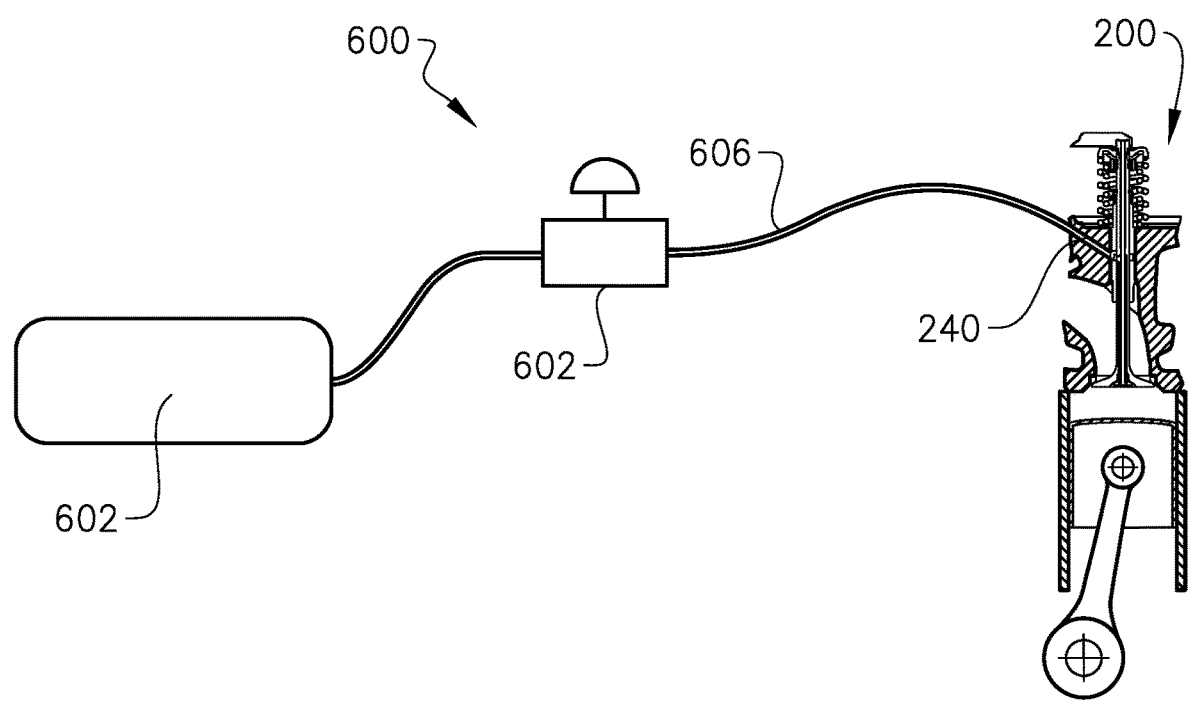
FIG. 8 illustrates schematically an air supply arrangement for use with a valve arrangement.

FIG. 8 schematically illustrates an air supply arrangement 600 comprising a pressurized air tank 602 for providing additional air to the cylinder. The flow of air from the pressurized air tank 602 to the feeder channel 240 is controlled by a valve 604 arranged on the air supply line 606. Thereby, the valve can be controlled so that additional air is only supplied to the cylinder during selected load cases when the addition of air is required.

It is to be understood that the present invention is not limited to the embodiments described above and illustrated in the drawings; rather, the skilled person will recognize that many changes and modifications may be made within the scope of the appended claims. The invention can for example be used in different kinds of combustion engines, e.g. diesel engines and gasoline engines. The invention is furthermore not limited to use in connection with turbocharged engines, but can also be used for supplying additional air in engines without turbo units.

The invention claimed is:

1. A valve arrangement for supplying air to a combustion chamber of an internal combustion engine, the valve arrangement comprising:
   a first valve, the first valve comprising a first valve head, a first valve stem assembly and an internal cavity, which is at least partly located in the first valve stem assembly, the first valve being movable between an upper, closed position of the valve, and a lower, open position, in which open position air provided via an air intake is supplied to the combustion chamber past the first valve head;

a second valve partly arranged within the internal cavity of the first valve, the second valve comprising a second valve head and a second valve stem assembly, and being movable within the internal cavity between an upper, closed position, in which closed position the second valve head is in contact with an inner surface of the first valve head, and a lower, open position in which open position additional air may be supplied to the combustion chamber via the internal cavity past the second valve head, wherein at least one air inlet for supplying the additional air to the internal cavity is arranged along a circumference of the first valve stem assembly, at least one of the at least one air inlets being separately arranged from the air intake;

a stem joining device extending between the first valve stem assembly and the second valve stem assembly and allowing relative movement between the first valve stem assembly and the second valve stem assembly between the closed position and the open position of the second valve, the stem joining device extending over a junction between the first valve stem assembly and the second valve stem assembly so as to form a junction seal; and a junction leakage preventing means being arranged to hinder leakage of liquid from the outside of the junction seal from reaching in between the first valve stem assembly and the second valve stem assembly.

2. A valve arrangement according to claim 1, wherein the stem joining device comprises an upper washer and a lower washer.

3. A valve arrangement according to claim 2, wherein the upper washer or the lower washer forms the junction seal.

4. A valve arrangement according to claim 2, wherein the upper washer is arranged in connection to the second valve stem assembly, and/or the lower washer is arranged in connection to the first valve stem assembly.

5. A valve arrangement according to claim 2, wherein a second spring member is arranged to act on the upper washer so as to bias the second valve stem assembly towards the closed position of the second valve.

6. A valve arrangement according to claim 2, wherein a first spring member is arranged to act on the lower washer so as to bias the first valve stem assembly towards the closed position of the first valve.

7. A valve arrangement according to claim 1, wherein the junction leakage preventing means comprises at least one member arranged on the outside of the junction seal.

8. A valve arrangement according to any one of the previous claims, wherein the junction leakage preventing means comprises a member being arranged upwards of the junction seal.

9. A valve arrangement according to claim 1, wherein the junction leakage preventing means comprises a member being arranged to seal between the stem joining arrangement and the first or second valve stem assembly.

10. A valve arrangement according to claim 1, wherein the junction leakage preventing means comprises a member being arranged inside the stem joining device.

11. A valve arrangement according to claim 9, wherein the member forms a sealing member.

12. A valve arrangement according to claim 9, wherein the member is compressible for allowing movement between the open and closed positions of the second valve.

13. A valve arrangement according to claim 1, wherein the junction leakage preventing means comprises at least one member being arranged on the inside of the junction seal.

14. A valve arrangement according to claim 1, wherein the junction leakage preventing means comprises a member being arranged between the first valve stem assembly and the second valve stem assembly, the member being arranged so as to form a protruding portion from the first valve stem assembly and the second valve stem assembly comprising a recess adapted to at least partially receive the protruding portion, when the second valve is in a fully open position.

15. A valve arrangement according to claim 1, wherein the junction leakage preventing means comprises a member in the form of a circumferential cavity in the junction seal, the circumferential cavity opening towards the junction between the first and second valve stent assemblies.

16. A valve arrangement according to claim 1, wherein the junction comprises a gap having a varying longitudinal extension between the closed and the open position of the second valve.

17. A valve arrangement according to claim 16, wherein the second valve stem assembly comprises a valve tip, the valve tip comprising a downward abutment surface, and the first valve stem assembly comprising an upward abutment surface, facing the downward abutment surface, wherein the gap is formed between the downward and upward abutment surfaces.

18. A valve arrangement according to claim 1, wherein a valve guide is arranged to surround a portion of the first valve stem assembly.

19. A valve arrangement according to claim 18, wherein the valve guide comprises an air passage allowing supply of additional air to the combustion chamber via the internal cavity in the first valve, when the first valve is in its closed position.

20. A valve arrangement according to claim 19, comprising a second leakage preventing means, for preventing liquid from leaking from a region externally of the first valve stem assembly to the valve guide air passage.

21. An internal combustion engine comprising a valve arrangement according to claim 1.

22. A vehicle comprising an internal combustion engine according to claim 21.

* * * * *